US012801399B2

(12) United States Patent
Farley et al.

(10) Patent No.: US 12,801,399 B2
(45) Date of Patent: Nov. 17, 2026

(54) STORAGE DEVICE/MULTI-OPERATING-SYSTEM LCS PROVISIONING SYSTEM

(71) Applicant: Dell Products L.P., Round Rock, TX (US)

(72) Inventors: Douglas Lang Farley, Round Rock, TX (US); Srinivas Giri Raju Gowda, Fremont, CA (US); Scott Bruns, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 118 days.

(21) Appl. No.: 19/015,962

(22) Filed: Jan. 10, 2025

(65) Prior Publication Data

US 2026/0203070 A1 Jul. 16, 2026

(51) Int. Cl.
*G06F 9/44* (2018.01)
*G06F 9/4401* (2018.01)

(52) U.S. Cl.
CPC .................................. *G06F 9/4406* (2013.01)

(58) Field of Classification Search
CPC .................................................... G06F 9/4406
See application file for complete search history.

(56) References Cited

U.S. PATENT DOCUMENTS 12,032,977 B2 * 7/2024 Rodriguez ............ G06F 9/4401
2004/0068645 A1 * 4/2004 Larvoire ................ G06F 9/441 713/1
2017/0147361 A1 * 5/2017 Kirvan ................ G06F 9/44505
2018/0032733 A1 * 2/2018 Surdu ................... G06F 9/4418
2020/0241747 A1 * 7/2020 Gupta ..................... G06F 21/62
2024/0281234 A1 * 8/2024 Yang ..................... G06F 21/572
2026/0025371 A1 * 1/2026 Farley ..................... H04L 63/08

* cited by examiner

*Primary Examiner* — Zahid Choudhury
(74) *Attorney, Agent, or Firm* — Joseph Mencher

(57) ABSTRACT

A storage device/multi-operating-system LCS provisioning system includes a BMS having a storage device and including a BIOS. The BIOS uses a first BIOS identity to create a primary OS region and a secondary OS region of the storage device, secure the primary OS region, and provide a primary OS via the primary OS region. The primary OS then installs a secondary OS image on the secondary OS region, and the BIOS uses the first BIOS identity to lock the primary OS region. The BIOS then uses a second BIOS identity and the secondary OS image on the secondary OS region to provide a secondary OS via the secondary OS region, and the use of the first BIOS identity to secure of the primary OS region along with the use of the second BIOS identity to provide the secondary OS prevents the secondary OS from accessing the primary OS region.

20 Claims, 28 Drawing Sheets

STORAGE DEVICE/MULTI-OPERATING-SYSTEM LCS PROVISIONING SYSTEM

BACKGROUND

The present disclosure relates generally to information handling systems, and more particularly to providing multiple operating systems on a storage device in an information handling system for use in providing Logically Composed Systems (LCSs).

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure them to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, an LCS may be provided using a Bare Metal Server (BMS), with processing resources and memory resources in the BMS used to provide an Operating System (OS) for the LCS, and with different resources that may be included in the BMS and/or that are connected to the BMS via a network used to provide any desired functionality for the LCS. In some situations, it may be desirable to provide both an "LCS provider" OS and an "LCS user" OS on the BMS for use in providing the LCS. For example, an LCS provider may provide an LCS provider microvisor (i.e., the LCS provider OS discussed above) on the BMS to configure it to provide the LCSs discussed above, and then an LCS user may request that an LCS user microvisor (i.e., the LCS user OS discussed above) be provided on the BMS for subsequent use in providing the OS for their LCS (i.e., when the LCS user wants to use their own microvisor to provide their LCS using the resources of the LCS provider). However, in many cases the BMS will only include a single "bootstrap media" storage device (e.g., a Solid State Drive (SSD) storage device) available for providing both the LCS provider OS and the LCS user OS, which can raise some issues.

For example, in conventional BMSs, the provisioning of the LCS provider OS and the LCS user OS on the same "bootstrap media" storage device involves performing conventional partitioning operations to provide an LCS provider OS partition and an LCS user OS partition on the "bootstrap media" storage device, provide the LCS provider OS on the LCS provider OS partition of the "bootstrap media" storage device, and then provide the LCS user OS on the LCS user OS partition of the "bootstrap media" storage device. However, when the LCS user OS is provided on the LCS user OS partition of the "bootstrap media" storage device, the LCS user OS will often view the entire "bootstrap media" storage device as being owned by the LCS user OS and, in response, may attempt to overwrite code that provides the LCS provider OS, install/inject code into the LSC provider OS that can result in security issues, and/or perform other actions that can negatively affect the LCS provider OS. One conventional solution to such issues includes providing separate "bootstrap media" storage devices for each of the LCS provider OS and the LCS user OS, which raises the costs of the BMS. Another conventional solution to such issues includes a remote provisioning (i.e., a "remote boot") of the LCS provider OS so that the LCS user OS may be provided by itself on the "bootstrap media" storage device, which requires access, remote orchestration, and supporting components for using remote bootstrap media that enables the remote provisioning discussed above.

Accordingly, it would be desirable to provide a storage device/multi-operating-system LCS provisioning system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) that is configured to: create, using a first BIOS identity, a first primary Operating System (OS) region and a secondary OS region of a storage device in a Bare Metal Server (BMS); secure, using the first BIOS identity, the first primary OS region of the storage device; provide, using the first BIOS identity, a primary OS via the first primary OS region of the storage device, wherein the primary OS installs a secondary OS image on the secondary OS region of the storage device; lock, using the first BIOS identity, the first primary OS region of the storage device; and provide, using a second BIOS identity and the secondary OS image on the secondary OS region of the storage device, a secondary OS via the secondary OS region of the storage device, wherein the securing of the first primary OS region of the storage device using the first BIOS identity and the providing of the secondary OS via the secondary OS region of the storage device using the second BIOS identity prevents the secondary OS from accessing the first primary OS region of the storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
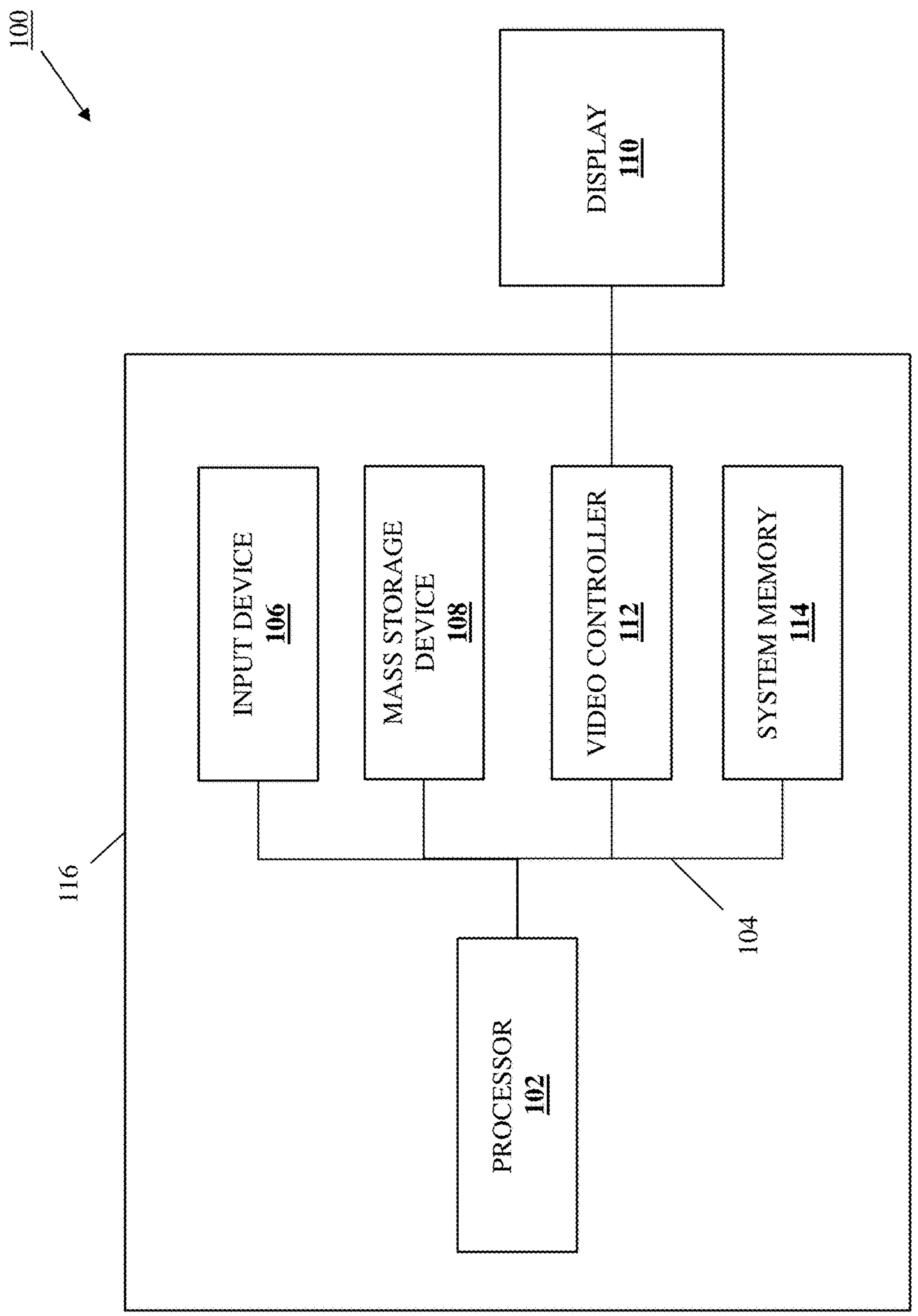
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the storage device/multi-operating-system Logically Composed System (LCS) provisioning systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
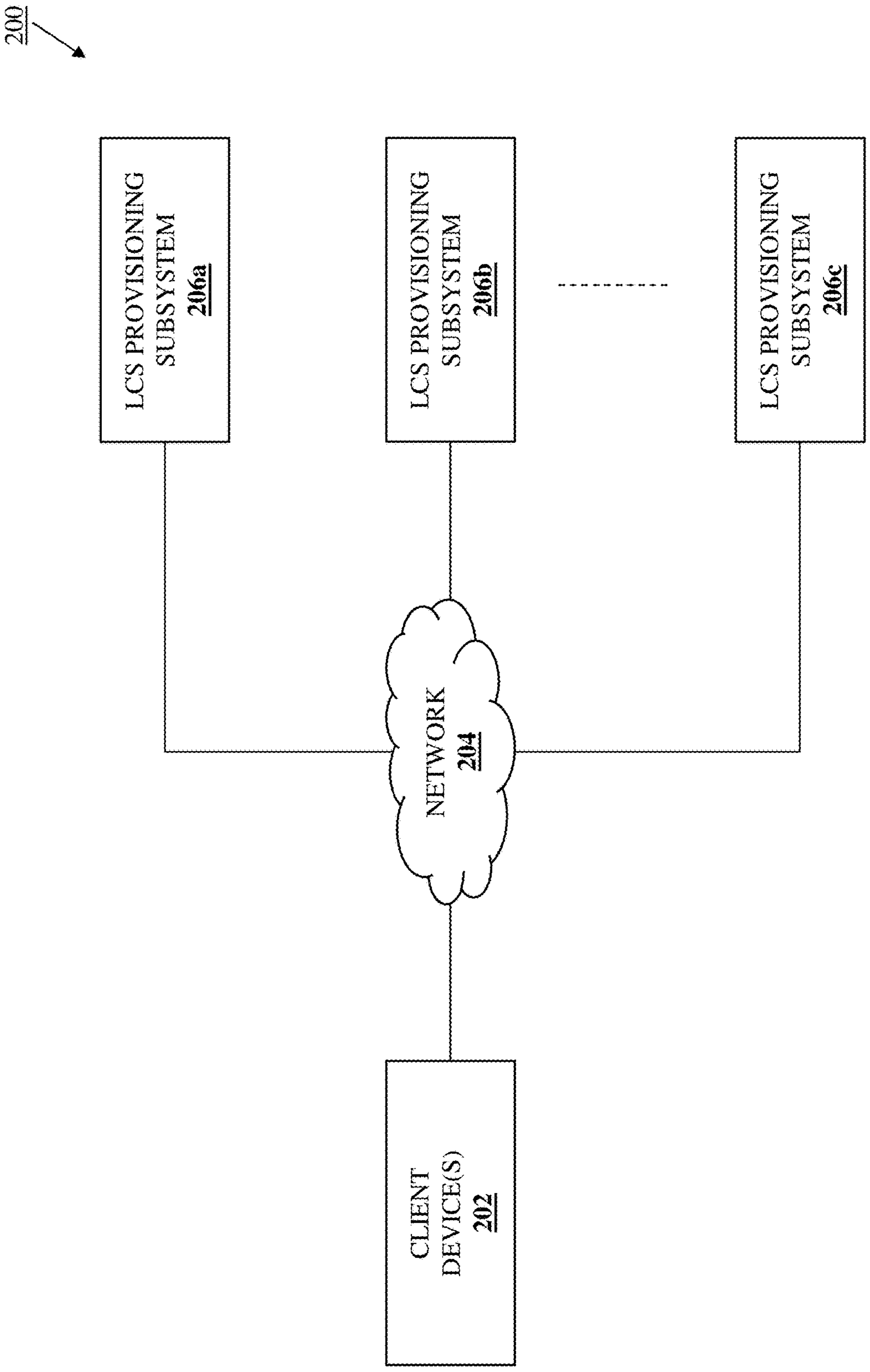
FIG. 2 is a schematic view illustrating an embodiment of an LCS provisioning system.

With reference to FIG. 2, an embodiment of a Logically Composed System (LCS) provisioning system 200 is illustrated that may be utilized with the storage device/multi-operating-system LCS provisioning systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206*a*, 206*b*, and up to 206*c* are coupled to the network 204 such that any or all of those LCS provisioning subsystems 206*a*-206*c* may provide LCSs to the client device(s) 202 as discussed in further detail below. In an embodiment, any or all of the LCS provisioning subsystems 206*a*-206*c* may include one or more of the IHS 100 discussed above with reference to FIG. 1 and/or may include some or all of the components of the IHS 100. For example, in some of the specific examples provided below, each of the LCS provisioning subsystems 206*a*-206*c* may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206*a*-206*c*) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
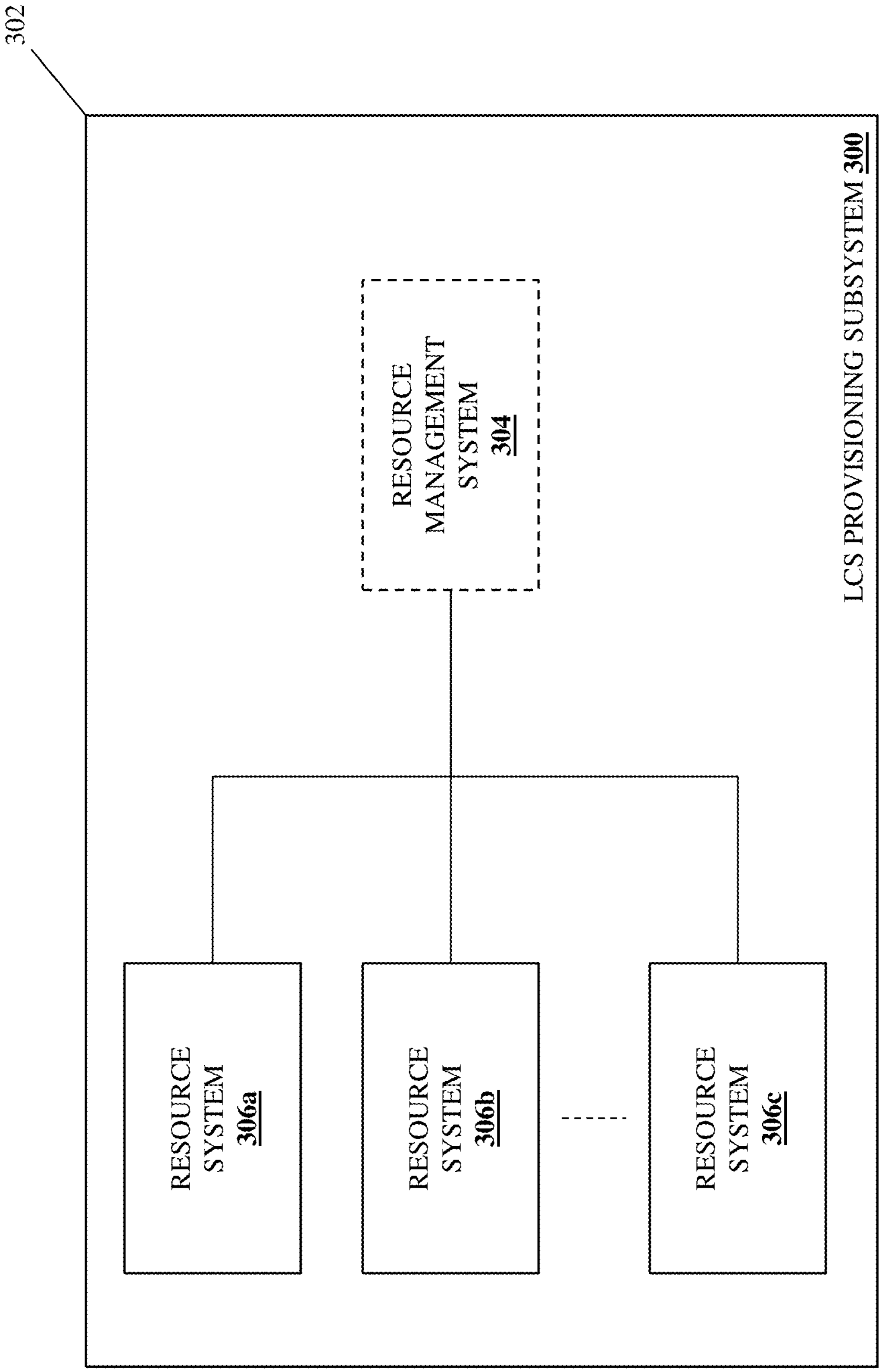
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206*a*-206*c* discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306*a*, 306*b*, and up to 306*c*. In an embodiment, any of the resource management system 304 and the resource systems 306*a*-306*c* may be provided by the IHS 100 discussed above with reference to FIG. 1 and/or may include some or all of the components of the IHS 100. In the specific embodiments provided below, each of the resource management system 304 and the resource systems 306*a*-306*c* may include a System Control Processor (SCP) device that may be conceptualized as an "enhanced" SmartNIC device that may be configured to perform functionality that is not available in conventional SmartNIC devices such as, for example, the resource management functionality, LCS provisioning functionality, and/or other SCP functionality described herein.

In an embodiment, any of the resource systems 306*a*-306*c* may include any of the resources described below coupled to an SCP device that is configured to facilitate management of those resources by the resource management system 304. Furthermore, the SCP device included in the resource management system 304 may provide an SCP Manager (SCPM) subsystem that is configured to manage the SCP devices in the resource systems 306*a*-306*c*, and that performs the functionality of the resource management system 304 described below. In some examples, the resource management system 304 may be provided by a "stand-alone" system (e.g., that is provided in a separate chassis from each of the resource systems 306*a*-306*c*), and the SCPM subsystem discussed below may be provided by a dedicated SCP device, processing/memory resources, and/or other components in that resource management system 304. However, in other embodiments, the resource management system 304 may be provided by one of the resource systems 306*a*-306*c* (e.g., it may be provided in a chassis of one of the resource systems 306*a*-306*c*), and the SCPM subsystem may be provided by an SCP device, processing/memory resources, and/or any other components om that resource system.

As such, the resource management system 304 is illustrated with dashed lines in FIG. 3 to indicate that it may be a stand-alone system in some embodiments, or may be provided by one of the resource systems 306*a*-306*c* in other embodiments. Furthermore, one of skill in the art in possession of the present disclosure will appreciate how SCP devices in the resource systems 306*a*-306*c* may operate to "elect" or otherwise select one or more of those SCP devices to operate as the SCPM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
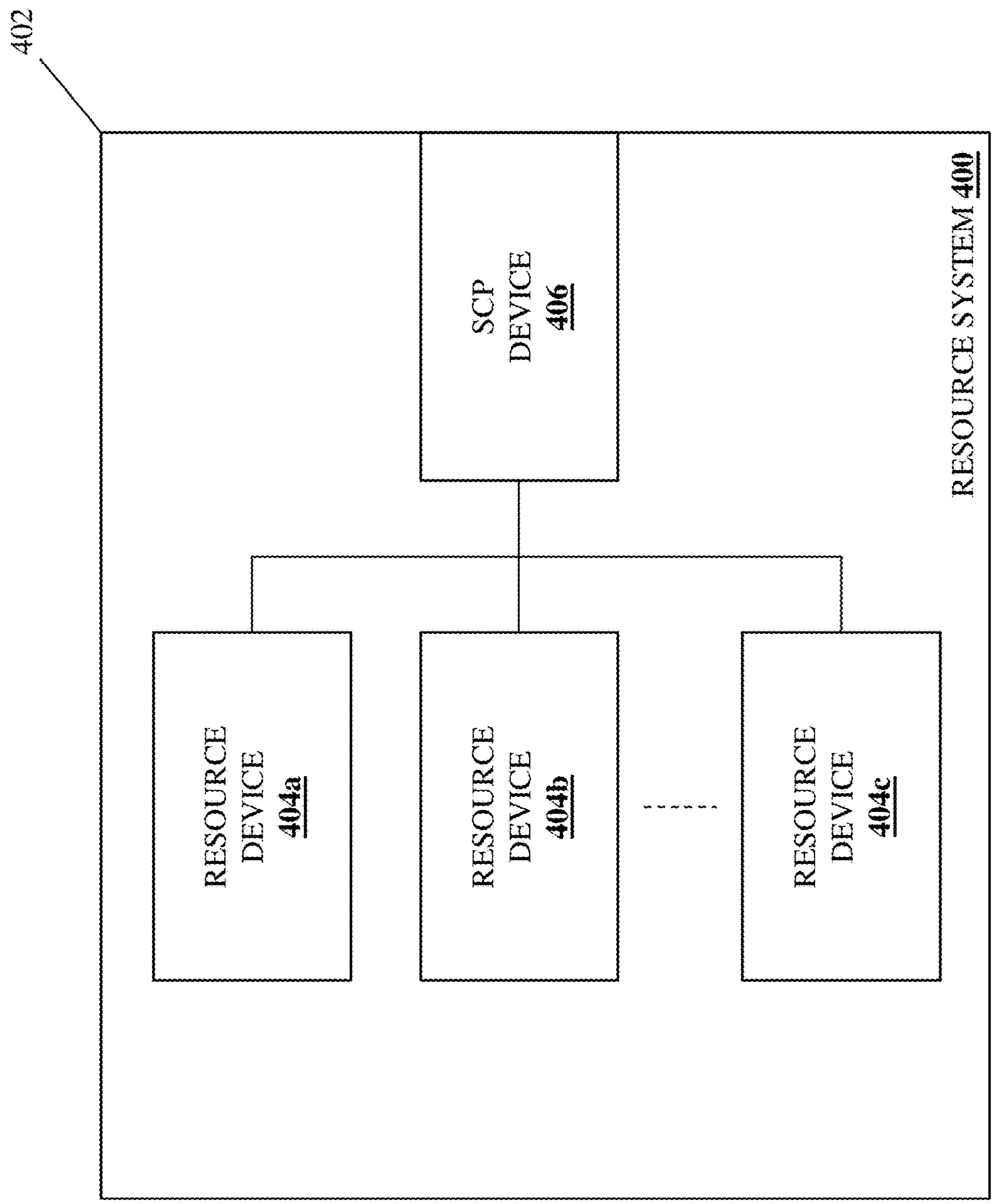
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306*a*-306*c* discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406. In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404*a*, 404*b*, and up to 404*c*, each of which is coupled to the SCP device 406. For example, the resource devices 404*a*-404*c* may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404*a*-404*c* discussed below. As such, the resource devices 404*a*-404*c* in the resource systems 306*a*-306*c*/400 may be considered a "pool" of resources that are available to the resource management system 304 for use in composing LCSs.

To provide a specific example, the SCP devices described herein may operate to provide a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. Further, as discussed below, the SCP devices describe herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on other devices while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404*a*-404*c*. For example, the chassis 402 of the resource system 400 may house a plurality of processing systems (i.e., the resource devices 404*a*-404*c*) coupled to the SCP device 406. In another example, the chassis 402 of the resource system 400 may house a plurality of memory systems (i.e., the resource devices 404*a*-404*c*) coupled to the SCP device 406. In another example, the chassis 402 of the resource system 400 may house a plurality of storage devices (i.e., the resource devices 404*a*-404*c*) coupled to the SCP device 406. In another example, the chassis 402 of the resource system 400 may house a plurality of networking devices (i.e., the resource devices 404*a*-404*c*) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404*a*-404*c* for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404*a*-404*c* while remaining within the scope of the present disclosure as well.

Figure 5:
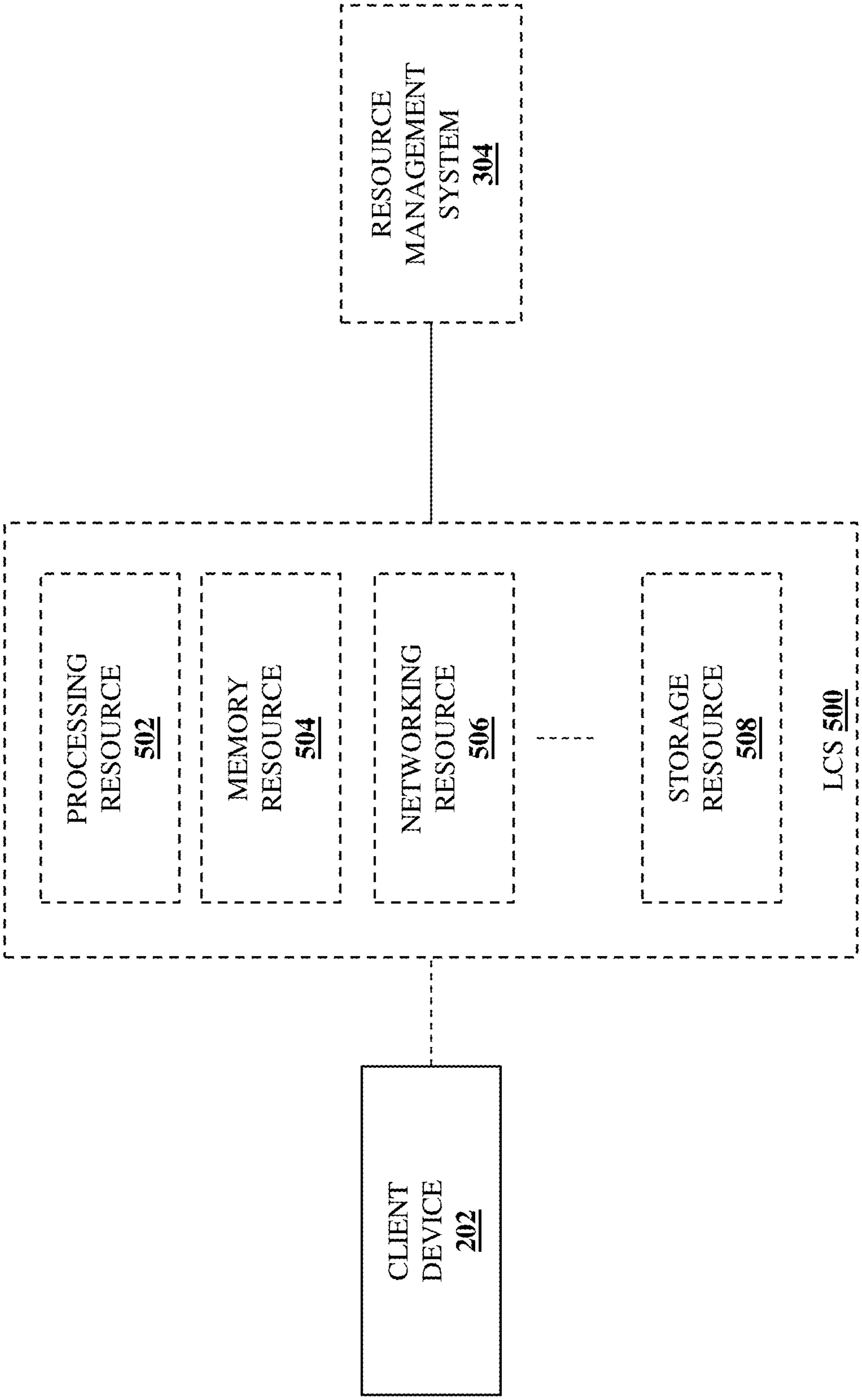
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206*a*-206*c*, and may be satisfied using resource systems that are included within that LCS provisioning subsystem, or satisfied using resource systems that are included across the different LCS provisioning subsystems 206*a*-206*c*.

As such, the resource management system 304 in the LCS provisioning subsystem that received the workload intent may operate to compose the LCS 500 using resource devices 404*a*-404*c* in the resource systems 306*a*-306*c*/400 in that LCS provisioning subsystem, and/or resource devices 404*a*-404*c* in the resource systems 306*a*-306*c*/400 in any of the other LCS provisioning subsystems. FIG. 5 illustrates the LCS 500 including a processing resource 502 allocated from one or more processing systems provided by one or more of the resource devices 404*a*-404*c* in one or more of the resource systems 306*a*-306*c*/400 in one or more of the LCS provisioning subsystems 206*a*-206*c*, a memory resource 504 allocated from one or more memory systems provided by one or more of the resource devices 404*a*-404*c* in one or more of the resource systems 306*a*-306*c*/400 in one or more of the LCS provisioning subsystems 206*a*-206*c*, a networking resource 506 allocated from one or more networking devices provided by one or more of the resource devices 404*a*-404*c* in one or more of the resource systems 306*a*-306*c*/400 in one or more of the LCS provisioning subsystems 206*a*-206*c*, and/or a storage resource 508 allocated from one or more storage devices provided by one or more of the resource devices 404*a*-404*c* in one or more of the resource systems 306*a*-306*c*/400 in one or more of the LCS provisioning subsystems 206*a*-206*c*.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306*a*-306*c*/400 that allocate any of the resource devices 404*a*-404*c* that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
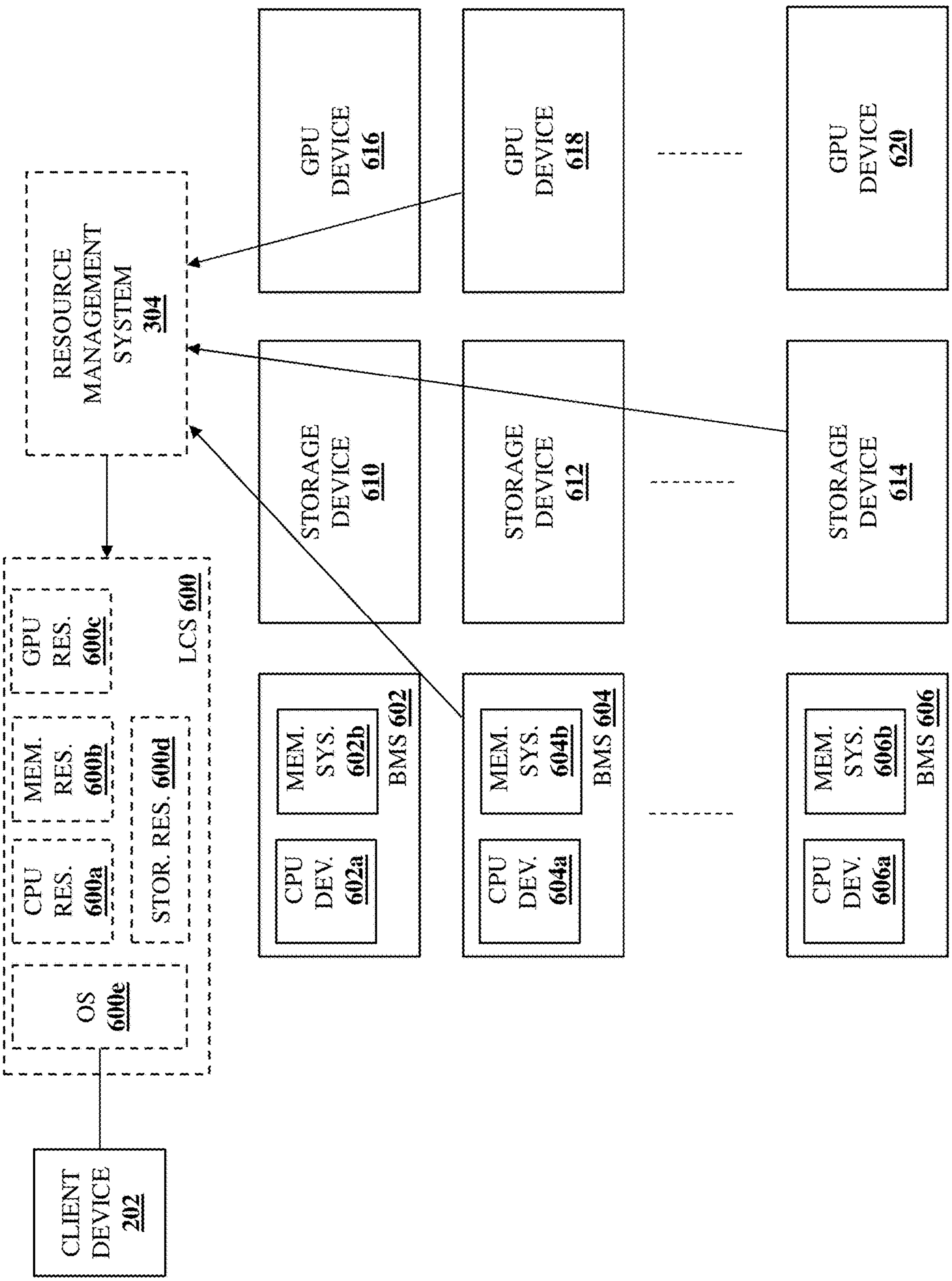
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306*a*-306*c* available to the resource management system 304 include a Bare Metal Server (BMS) 602 having a Central Processing Unit (CPU) device 602*a* and a memory system 602*b*, a BMS 604 having a CPU device 604*a* and a memory system 604*b*, and up to a BMS 606 having a CPU device 606*a* and a memory system 606*b*. Furthermore, one or more of the resource systems 306*a*-306*c* includes resource devices 404*a*-404*c* provided by a storage device 610, a storage device 612, and up to a storage device 614. Further still, one or more of the resource systems 306*a*-306*c* includes resource devices 404*a*-404*c* provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600*a* that utilize the CPU device 604*a* in the BMS 604, and memory resources 600*b* that utilize the memory system 604*b* in the BMS 604. Furthermore, the resource management system 304 may compose the LCS 600 using the storage device 614 to provide the LCS 600 with storage resources 600*d*, and using the GPU device 318 to provide the LCS 600 with GPU resources 600*c*. As illustrated in the specific example in FIG. 6, the CPU device 604*a* and the memory system 604*b* in the BMS 604 may be configured to provide an operating system 600*e* that is presented to the client device 202 as being provided by the CPU resources 600*a* and the memory resources 600*b* in the LCS 600, with operating system 600*e* utilizing the GPU device 618 to provide the GPU resources 600*c* in the LCS 600, and utilizing the storage device 614 to provide the storage resources 600*d* in the LCS 600. The user of the client device 202 may then provide any application(s) on the operating system 600*e* provided by the CPU resources 600*a*/CPU device 604*a* and the memory resources 600*b*/memory system 604*b* in the LCS 600/BMS 604, with the application(s) operating using the CPU resources 600*a*/CPU device 604*a*, the memory resources 600*b*/memory system 604*b*, the GPU resources 600*c*/GPU device 618, and the storage resources 600*d*/storage device 614.

Furthermore, as discussed above, the SCP device(s) 406 in the resource systems 306*a*-306*c*/400 that allocates any of the CPU device 604*a* and memory system 604*b* in the BMS 604 that provide the CPU resource 600*a* and memory resource 600*b*, the GPU device 618 that provides the GPU resource 600*c*, and the storage device 614 that provides storage resource 600*d*, may also allocate SCP hardware and/or perform enhanced functionality (e.g., the enhanced storage functionality in the specific examples provided above) for any of those resources that may otherwise not be available in the CPU device 604*a*, memory system 604*b*, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600*c* may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600*a*, the memory resources 600*b*, the GPU resources 600*c*, and the storage resources 600*d*, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
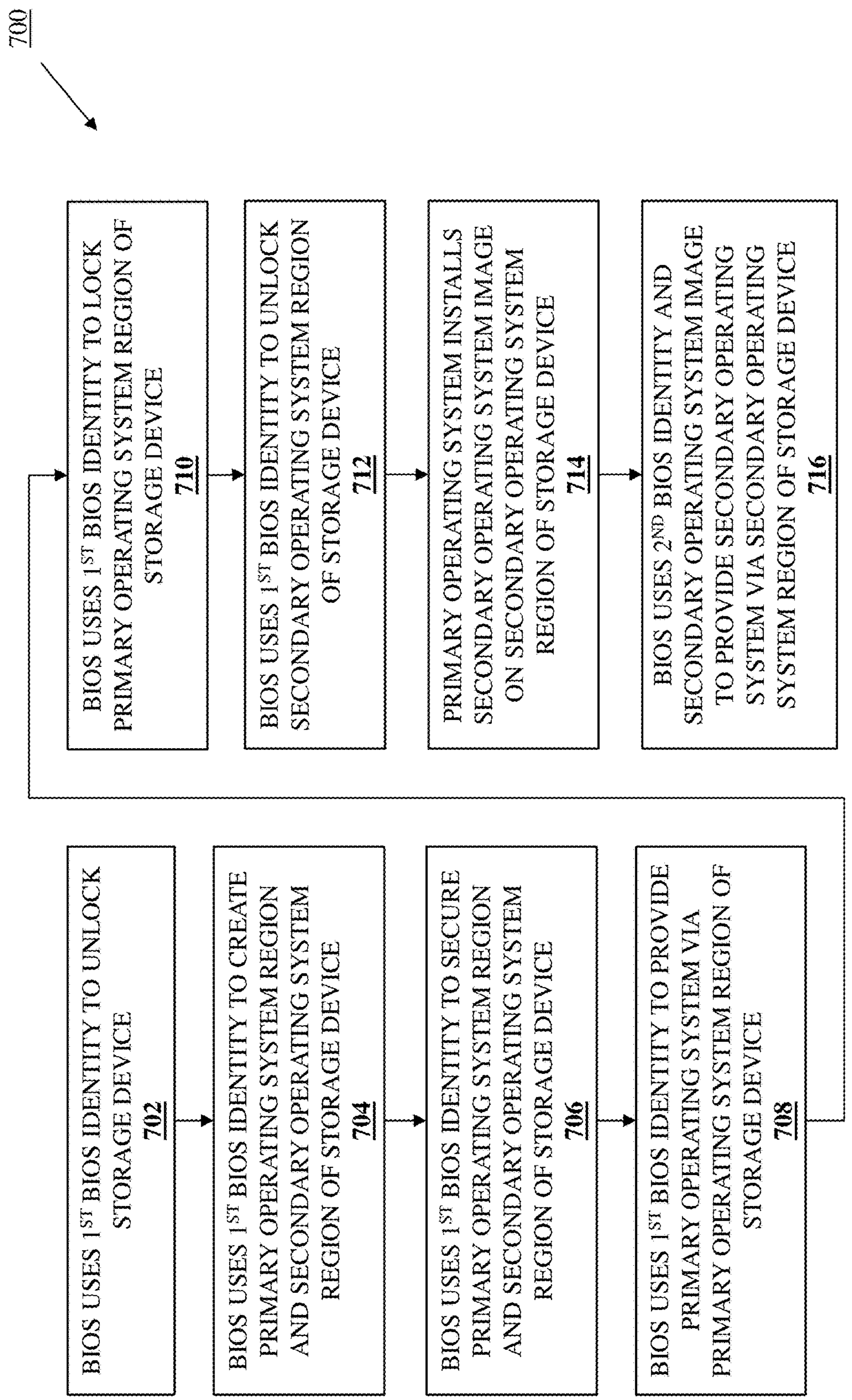
FIG. 7 is a flow chart illustrating an embodiment of a method for providing LCSs using multiple operating systems on a storage device.

Referring now to FIG. 7, an embodiment of a method 700 for providing LCSs using multiple operating systems on a storage device is illustrated. As discussed below, the systems and methods of the present disclosure provide a primary operating system and a secondary operating system on a storage device while preventing the secondary operating system from accessing the region of the storage device used to provide the primary operating system. For example, the storage device/multi-operating-system LCS provisioning system of the present disclosure may include a BMS having a storage device and including a BIOS. The BIOS uses a first BIOS identity to create a primary OS region and a secondary OS region of the storage device, secure the primary OS region, and provide a primary OS via the primary OS region. The primary OS then installs a secondary OS image on the secondary OS region, and the BIOS uses the first BIOS identity to lock the primary OS region. The BIOS then uses a second BIOS identity and the secondary OS image on the secondary OS region to provide a secondary OS via the secondary OS region, and the use of the first BIOS identity to secure of the primary OS region along with the use of the second BIOS identity to provide the secondary OS prevents the secondary OS from accessing the primary OS region. As such, a single storage device in a BMS may be used to provide multiple operating systems while ensuring that one of those operating systems cannot modify or compromise the security of the other.

Figure 8:
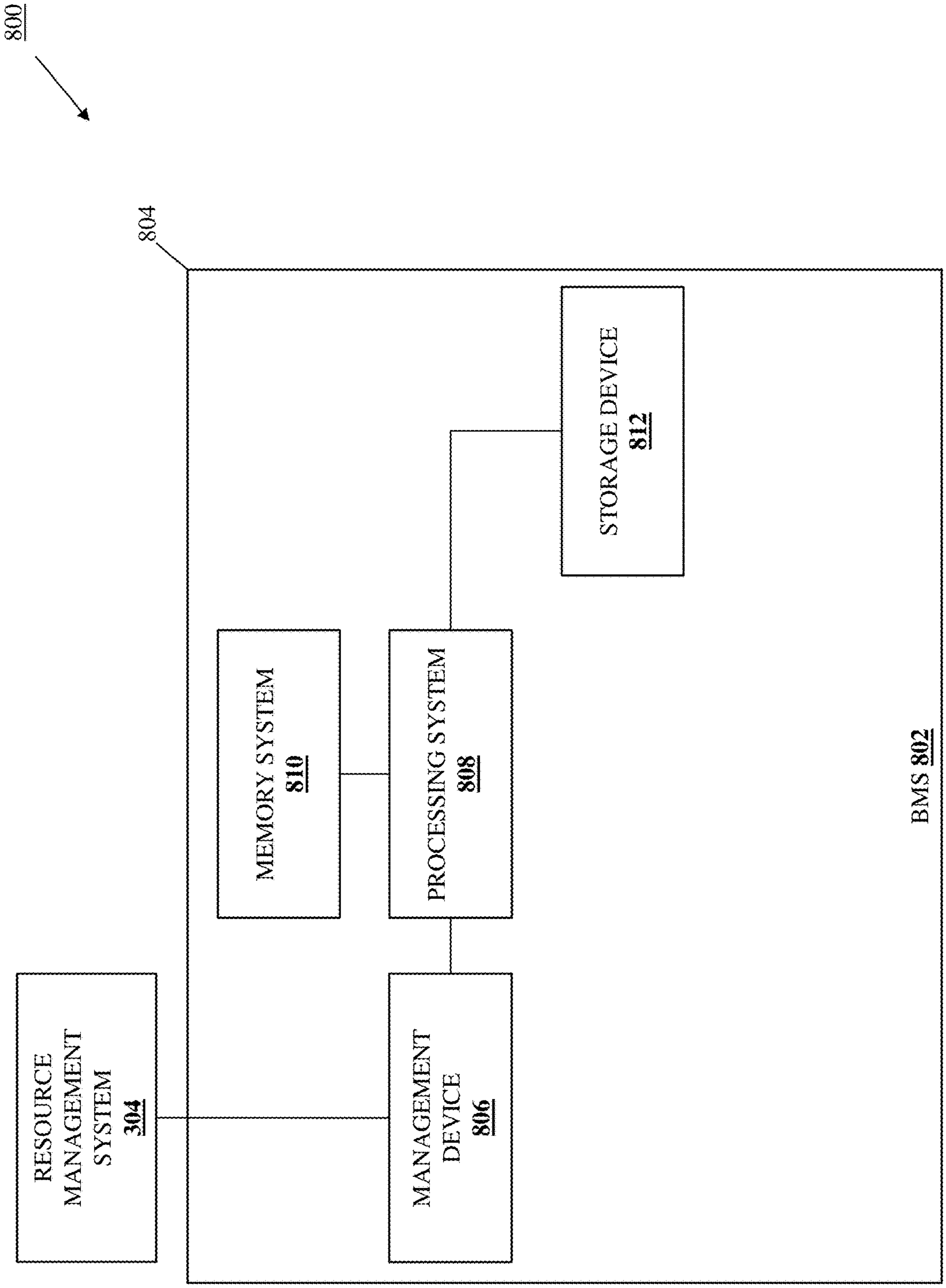
FIG. 8 is a schematic view illustrating an embodiment of the LCS provisioning subsystem of FIG. 3.

With reference to FIG. 8, an embodiment of an LCS provisioning subsystem 800 is illustrated that may be provided by the LCS provisioning subsystem 300 discussed above with reference to FIG. 3, with any of the resource systems 306*a*-306*c* provided by the resource system 400 discussed above with reference to FIG. 4. In the illustrated examples, the LCS provisioning subsystem 800 includes the resource management system 304 discussed above with reference to FIG. 3. As illustrated, a Bare Metal Server (BMS) 802 may be coupled to the resource management system 304, and may be provided by any of the BMSs 602-606 discussed above with reference to FIG. 6. The BMS 802 may include a chassis 804 that houses the components of the BMS 802, only some of which are illustrated and described below.

For example, the chassis 804 may house a management device 806 that is coupled to the resource management system 804. In some embodiments, the management device 806 may be provided by the SCP device 406 in the resource system 400 discussed above with reference to FIG. 4. In other embodiments, the management device 806 may be provided by a Baseboard Management Controller (BMC) device such as, for example, an integrated DELL® Remote Access Controller (iDRAC) device provided in BMSs available from DELL® Inc. of Round Rock, Texas, United States. However, while two specific examples have been provided, the management device 806 may be provided by a variety of devices that would be apparent to one of skill in the art in possession of the present disclosure. As will be appreciated by one of skill in the art in possession of the present disclosure, the management device 806 provides a secure control plane for the BMS 802 that "owns" the BMS 802 in order to provide for the secure configuration of the BMS 802 as described below.

The chassis 804 may also house a processing system 808 (e.g., the processor 102 discussed above with reference to FIG. 1 such as, for example, a Central Processing Unit (CPU)) that is coupled to the management device 806. Furthermore, the chassis 804 may also house a memory system 810 (e.g., the memory 114 discussed above with reference to FIG. 1 such as, for example, Dynamic Random Access Memory (DRAM)) that is coupled to the processing system 808 and that includes instructions that, when executed by the processing system 802, cause the processing system 802 to provide a BIOS discussed below. Finally, the chassis 804 may also house a storage device 812 that is coupled to the storage device 812 and that may be provided by a Solid State Drive (SSD) storage device such as, for example, a Non-Volatile Memory express (NVMe) SSD storage device. As will be appreciated by one of skill in the art in possession of the present disclosure, the storage device 812 provides a "bootstrap media storage device" in the BMS 802 described below that is used to provide multiple operating systems on the BMS 802, and thus may be provided by any of a variety of "bootstrap media" storage devices known in the art.

However, while a specific example of a BMS 802 has been illustrated and described and is used in the specific examples provided below, one of skill in the art in possession of the present disclosure will appreciate how BMSs utilized in the storage device/multi-operating-system LCS provisioning system of the present disclosure may include a variety of components and/or component configurations, as well as how the storage device/multi-operating-system LCS provisioning system of the present disclosure may be implemented in a variety of other systems, while remaining within the scope of the present disclosure as well.

Figure 9:
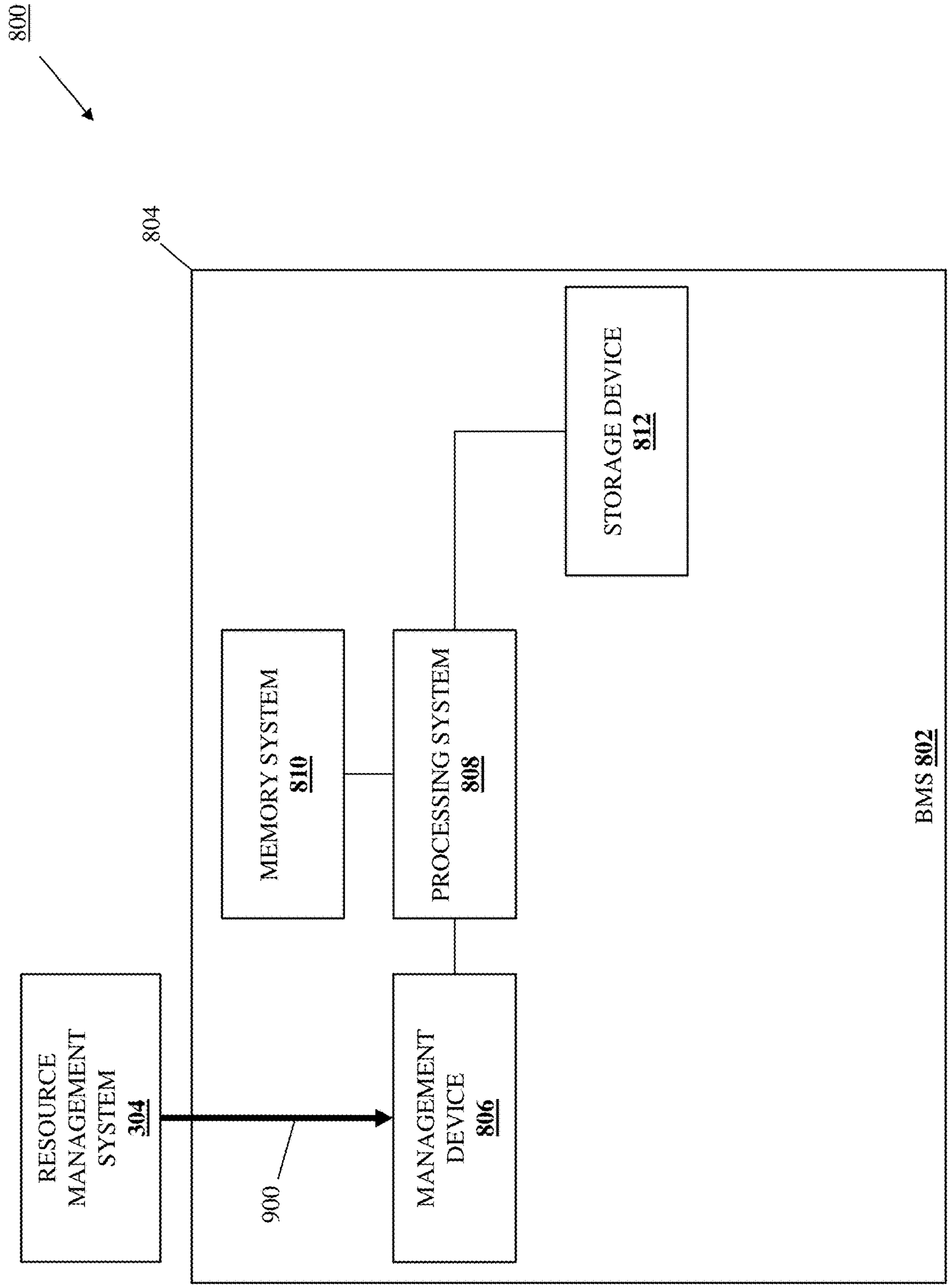
FIG. 9 is a schematic view illustrating an embodiment of the LCS provisioning subsystem of FIG. 8 operating during the method of FIG. 7.

The method 700 begins at block 702 where a BIOS uses a first BIOS identity to unlock a storage device. With reference to FIG. 9, the method 700 may be performed in the context of the configuration of the BMS 802 to provide LCSs and the use of the BMS 802 to provide LCSs as described above, and thus the resource management system 304 may perform BMS configuration instruction operations 900 that include the resource management system 304 instructing the management device 806 to configure the BMS 802 with the operating systems/microvisors discussed below that may then be used to provide LCSs. In response to receiving the instruction to configure the BMS 802 to provide LCSs, the management device 806 may cause the BMS 802 to power on, boot, reset, reboot, and/or otherwise initialize.

Figure 10:
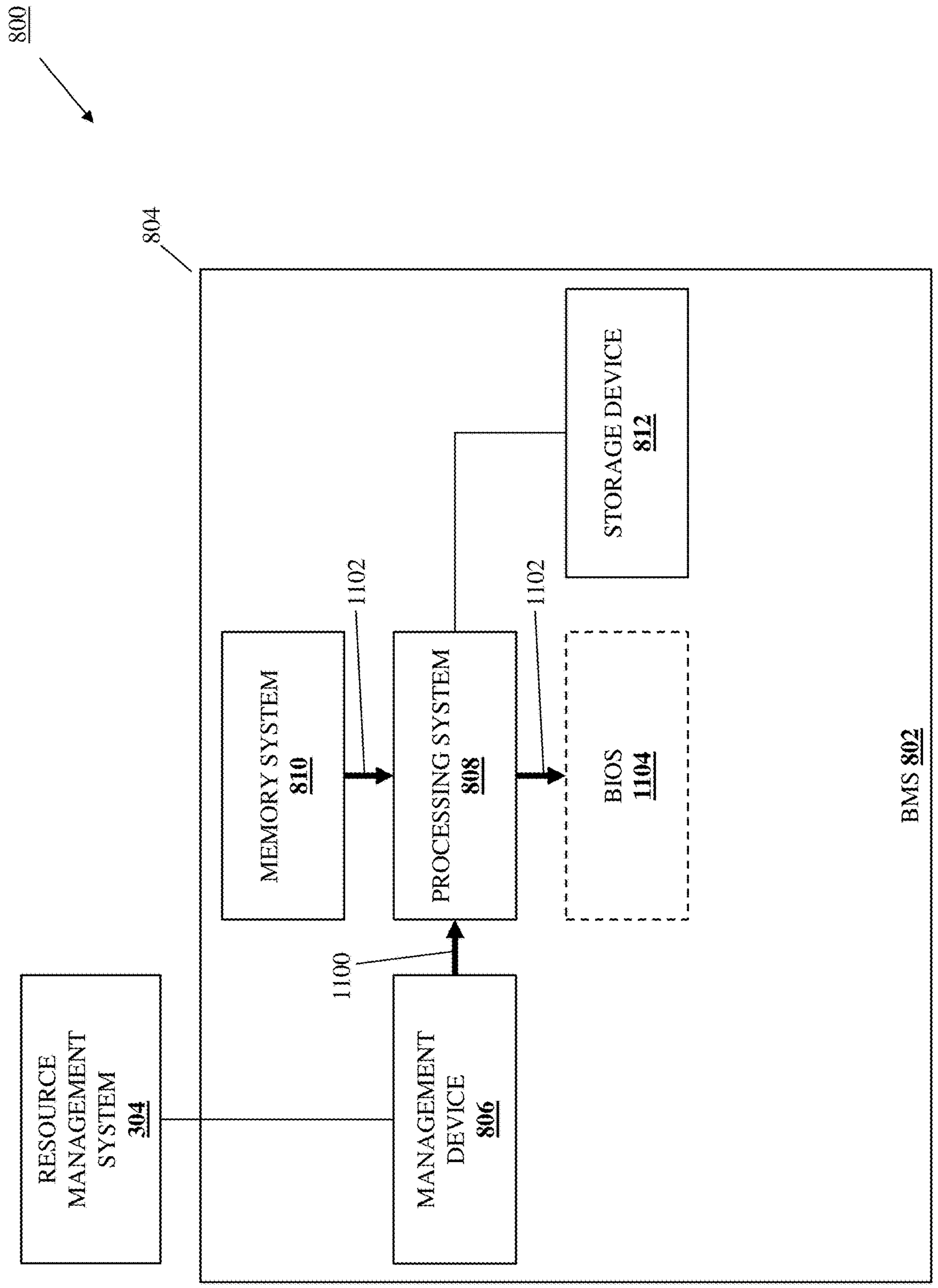
FIG. 10 is a schematic view illustrating an embodiment of the LCS provisioning subsystem of FIG. 8 operating during the method of FIG. 7.

With reference to FIG. 10, in response to initialization of the BMS 802, the management device 806 may perform first identity BIOS provisioning instruction operations 1100 that include transmitting an instruction to the processing system 808 to provide a BIOS that uses a first BIOS identity, with that instruction causing the processing system 808 to perform first identity BIOS provisioning operations 1102 that include executing BIOS instructions stored on the memory system 810 to provide a BIOS 1104 that uses a first BIOS identity. In the embodiments discussed below, the first BIOS identity of the BIOS 1104 is provided by making the first BIOS keys and second BIOS keys available to the BIOS 1104 (e.g., from a secure portion of the memory system, a Trusted Platform Module (TPM), and/or other key storage subsystems that would be apparent to one of skill in the art in possession of the present disclosure), while preventing a second BIOS identity of the BIOS provided by the processing system 808 from accessing the first BIOS keys. However, while a specific example of providing a BIOS that uses different BIOS identities has been provided, one of skill in the art in possession of the present disclosure will appreciate how other techniques for providing a BIOS that uses different BIOS identities will fall within the scope of the present disclosure as well.

Figure 11:
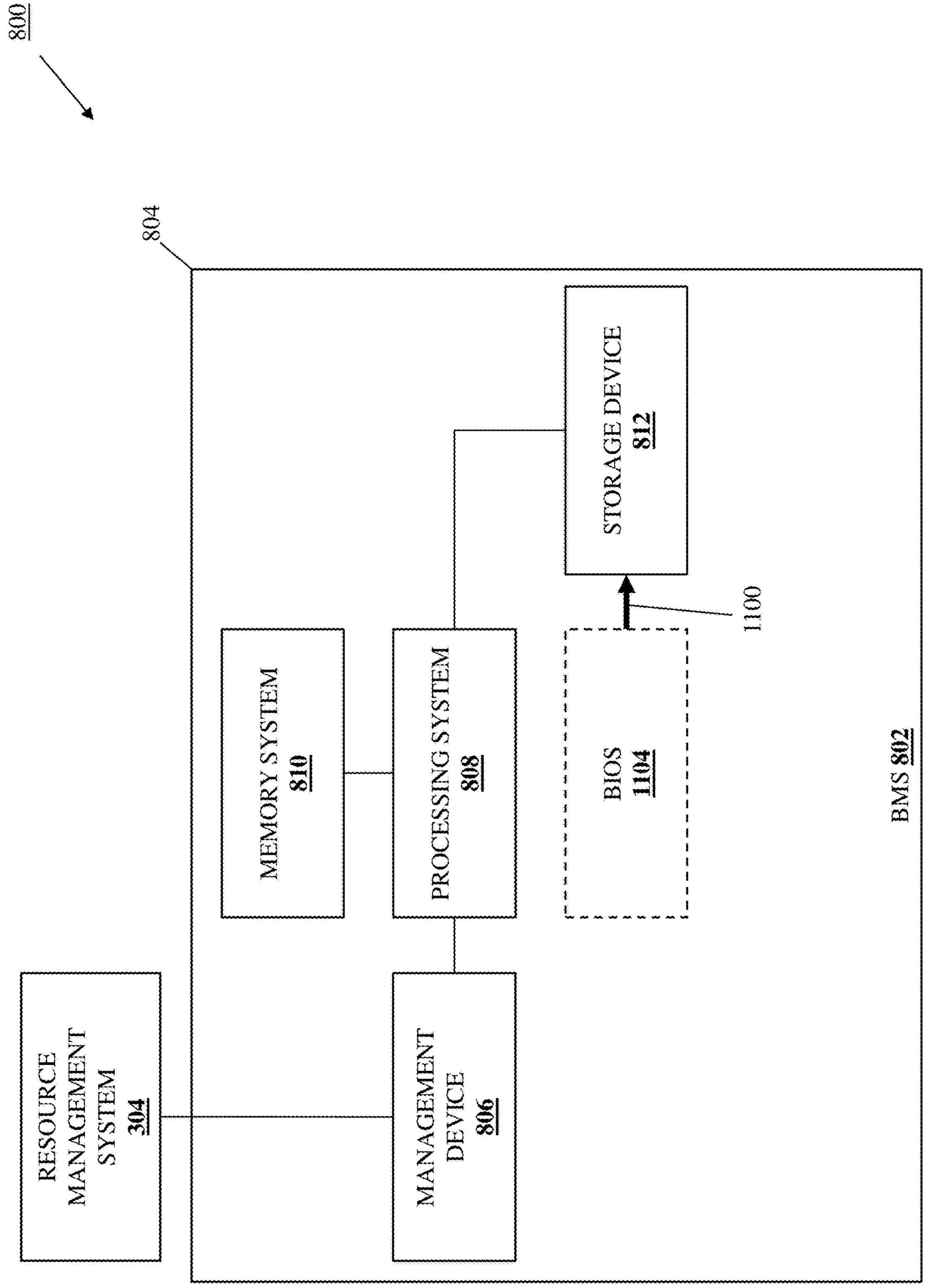
FIG. 11 is a schematic view illustrating an embodiment of the LCS provisioning subsystem of FIG. 8 operating during the method of FIG. 7.

With reference to FIG. 11, in an embodiment of block 702, the BIOS 1104 using the first BIOS identity may perform storage device unlocking operations 1100 that may include unlocking the storage device 812. For example, at block 702, the BIOS 1104 may access the first BIOS keys discussed above and use those first BIOS keys to unlock the storage device 812, which one of skill in the art in possession of the present disclosure will appreciate may include using Data at Rest Encryption (D@RE), OPAL, or other storage device unlocking techniques known in the art.

Figure 12:
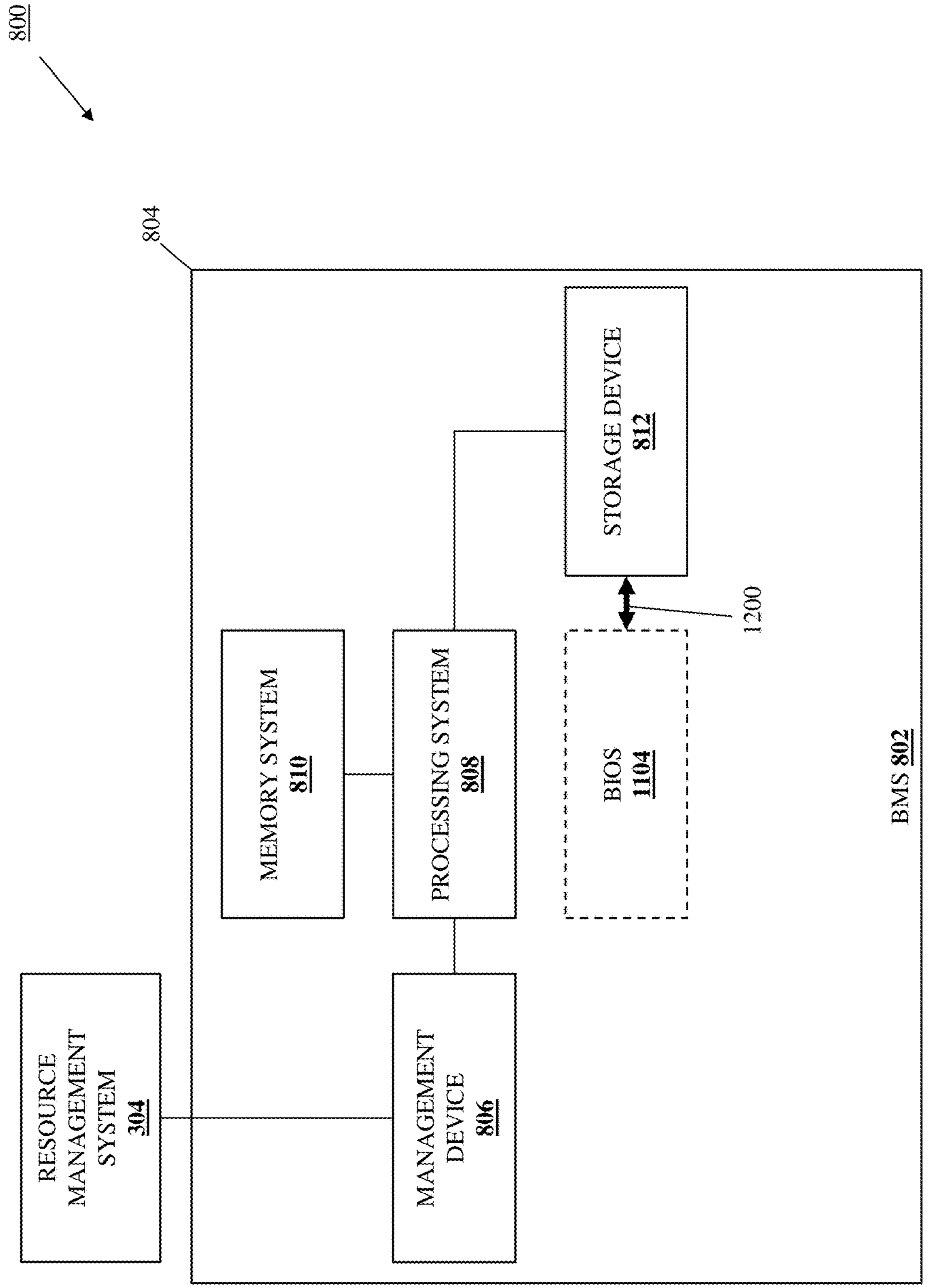
FIG. 12 is a schematic view illustrating an embodiment of the LCS provisioning subsystem of FIG. 8 operating during the method of FIG. 7.

The method 700 then proceeds to block 704 where the BIOS uses the first BIOS identity to create a primary operating system region and a secondary operating system region of the storage device. With reference to FIG. 12, in an embodiment of block 704, the BIOS 1104 may perform storage device configuration operations 1200 that include configuring the storage device 812 with a primary operating system region and a secondary operating system region. For example, at block 702, the BIOS 1104 may divide the physical or logical storage provided by the storage device 812 into a primary operating system region and a secondary operating system region, and each of those regions may be provided by separate partitions, namespaces, zones, logical volumes, and/or other storage regions that would be apparent to one of skill in the art in possession of the present disclosure.

Figure 13:
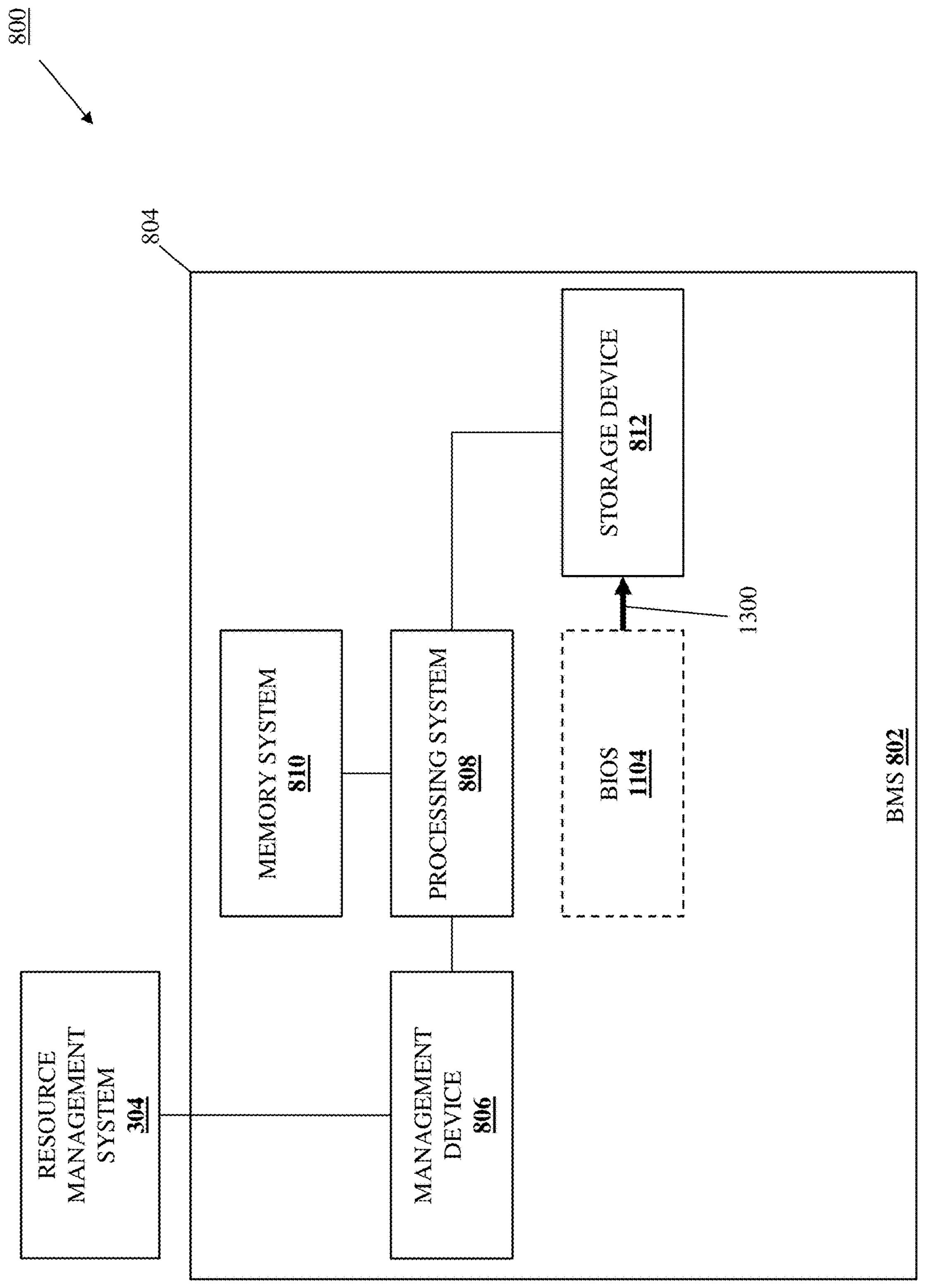
FIG. 13 is a schematic view illustrating an embodiment of the LCS provisioning subsystem of FIG. 8 operating during the method of FIG. 7.

The method 700 then proceeds to block 706 where the BIOS uses the first BIOS identity to secure the primary operating system region and the secondary operating system region of the storage device. With reference to FIG. 13, in an embodiment of block 706, the BIOS 1104 may perform operating system region securing operations 1300 that include taking control of the primary operating system region, accessing the first BIOS keys discussed above, and using those first BIOS keys to secure the primary operating system region (i.e., such that one or more of the first BIOS keys are required to access that primary operating system region). Furthermore, the operating system region securing operations 1300 may also include taking control of the secondary operating system region, accessing the second BIOS keys discussed above, and using those second BIOS keys to secure the secondary operating system region (i.e., such that one or more of the second BIOS keys are required to access that secondary operating system region). As will be appreciated by one of skill in the art in possession of the present disclosure, the securing of the secondary operating system region at block 706 in the examples provided below may include the BIOS 1104 using the second BIOS keys discussed above to lock the secondary operating system region.

Figure 14A:
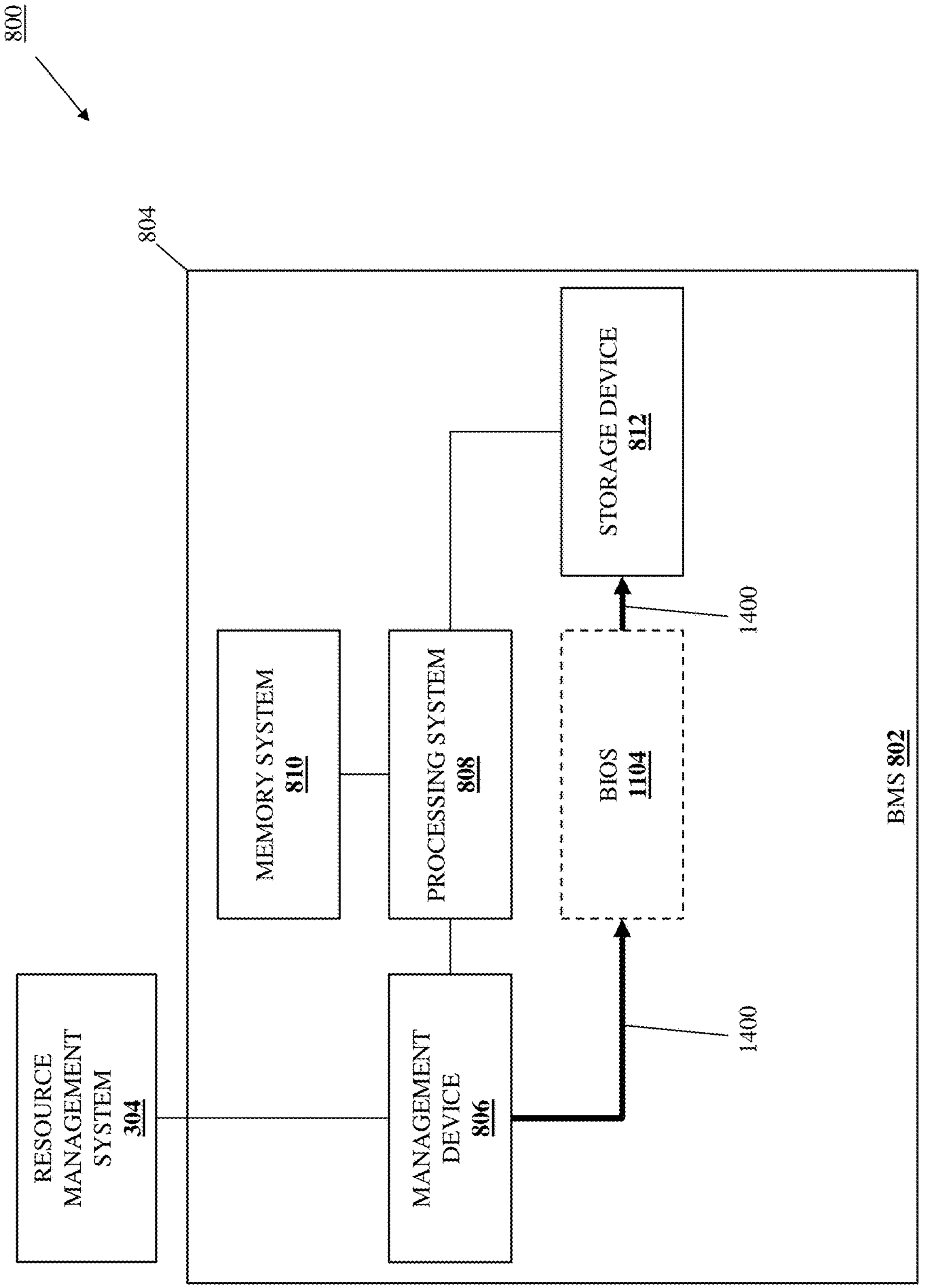
FIG. 14A is a schematic view illustrating an embodiment of the LCS provisioning subsystem of FIG. 8 operating during the method of FIG. 7.
Figure 14B:
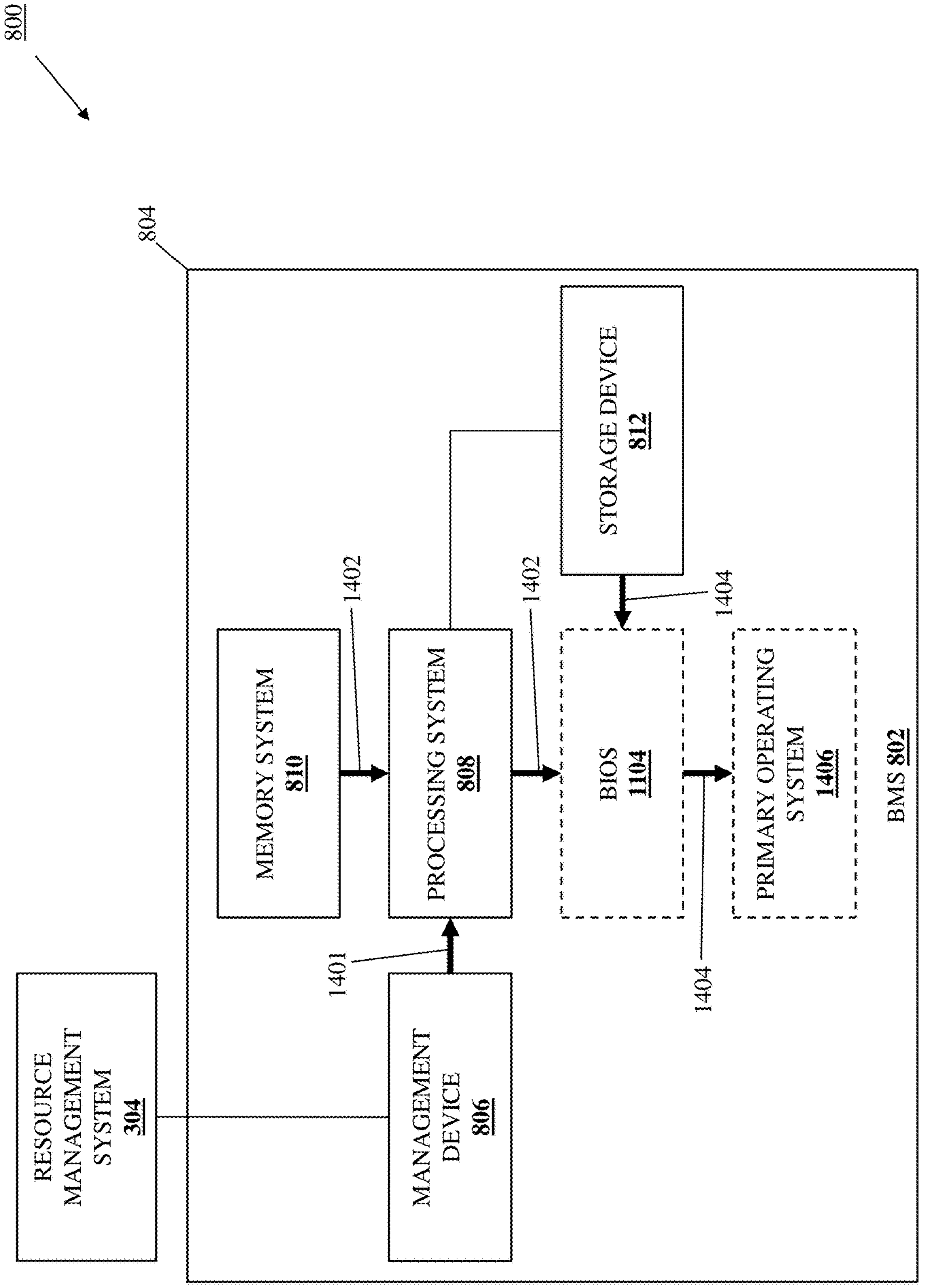
FIG. 14B is a schematic view illustrating an embodiment of the LCS provisioning subsystem of FIG. 8 operating during the method of FIG. 7.

The method 700 then proceeds to block 708 where the BIOS uses the first BIOS identity to provide a primary operating system via the primary operating system region of the storage device. With reference to FIG. 14A, in an embodiment of block 708, the BIOS 1104 may then perform primary operating system image provisioning operations 1400 that include retrieving a primary operating system image from the management device 806, and storing the primary operating system image in the storage device 812. With reference to FIG. 14B, the BIOS 1104 may then cause the BMS 802 to reboot and, in response, the management device 806 may perform first identity BIOS provisioning instruction operations 1401 that include transmitting an instruction to the processing system 808 to provide the BIOS 1104 that uses the first BIOS identity, with that instruction causing the processing system 808 to perform first identity BIOS provisioning operations 1402 that are similar to the first identity BIOS provisioning operations 1100 discussed above that provide the BIOS 1104 that uses the first BIOS identity.

The BIOS 1104 may then perform primary operating system provisioning operations 1404 that include accessing the primary operating system region of the storage device 812, and using the primary operating system image stored on the primary operating system region to provide a primary operating system 1406. To provide a specific example, the primary operating system 1406 may be provided by an LCS provider operating system such as an LCS provider microvisor that is configured to provide LCSs using the BMS 802, although other operating systems will fall within the scope of the present disclosure as well. As such, the LCS provider may consider the primary operating system 1406 to be a "trusted" operating system relative to the secondary operating system discussed below.

Figure 15:
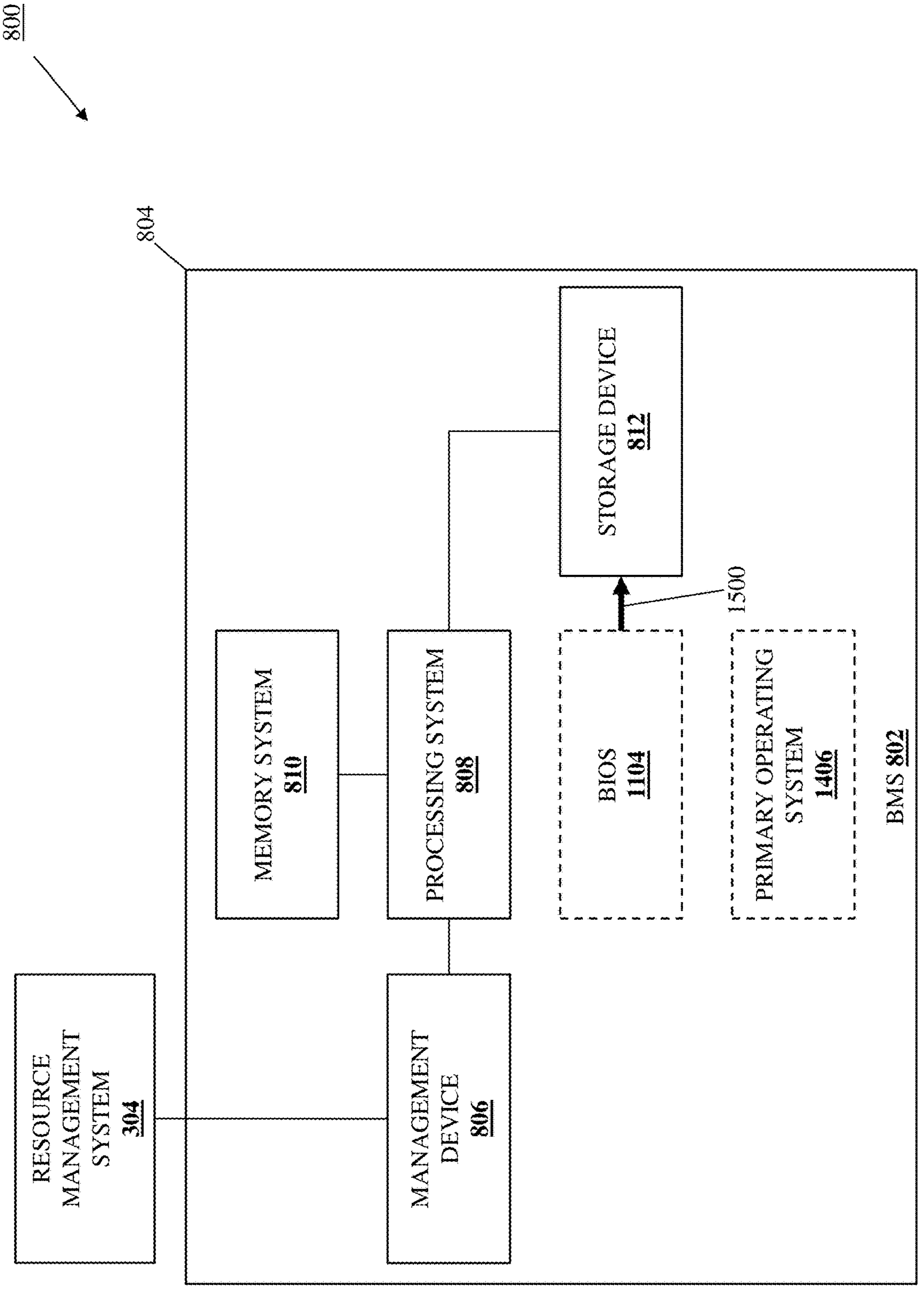
FIG. 15 is a schematic view illustrating an embodiment of the LCS provisioning subsystem of FIG. 8 operating during the method of FIG. 7.

The method 700 then proceeds to block 710 where the BIOS uses the first BIOS identity to lock the primary operating system region of the storage device. With reference to FIG. 15, in an embodiment of block 710 and following the provisioning of the primary operating system 1406, the BIOS 1104 may perform primary operating system region locking operations 1500 to lock the primary operating system region of the storage device 812. For example, at block 710, the BIOS 1104 may access the first BIOS keys discussed above, and may use the first BIOS keys to lock the primary operating system region of the storage device 812. As such, following the provisioning of the primary operating system at block 708, access to the primary operating system region of the storage device 812 requires the BIOS 1104 and the first BIOS keys that were used to lock it, and in some embodiments the BIOS 1104 may "detach" or otherwise configure the primary operating system region of the storage device 812 as "hidden" (e.g., even from the primary operating system 1406). However, in other embodiments, the primary operating system region of the storage device 812 may operate as "read-only". In either situation, write access to the primary operating system region of the storage device 812 may only be enabled during an "update mode" for the storage device 812 that must be initiated from the control plane provided by the management device 806, thus preventing any modification to the primary operating system region of the storage device 812 without authorization of the management device 806.

Figure 16:
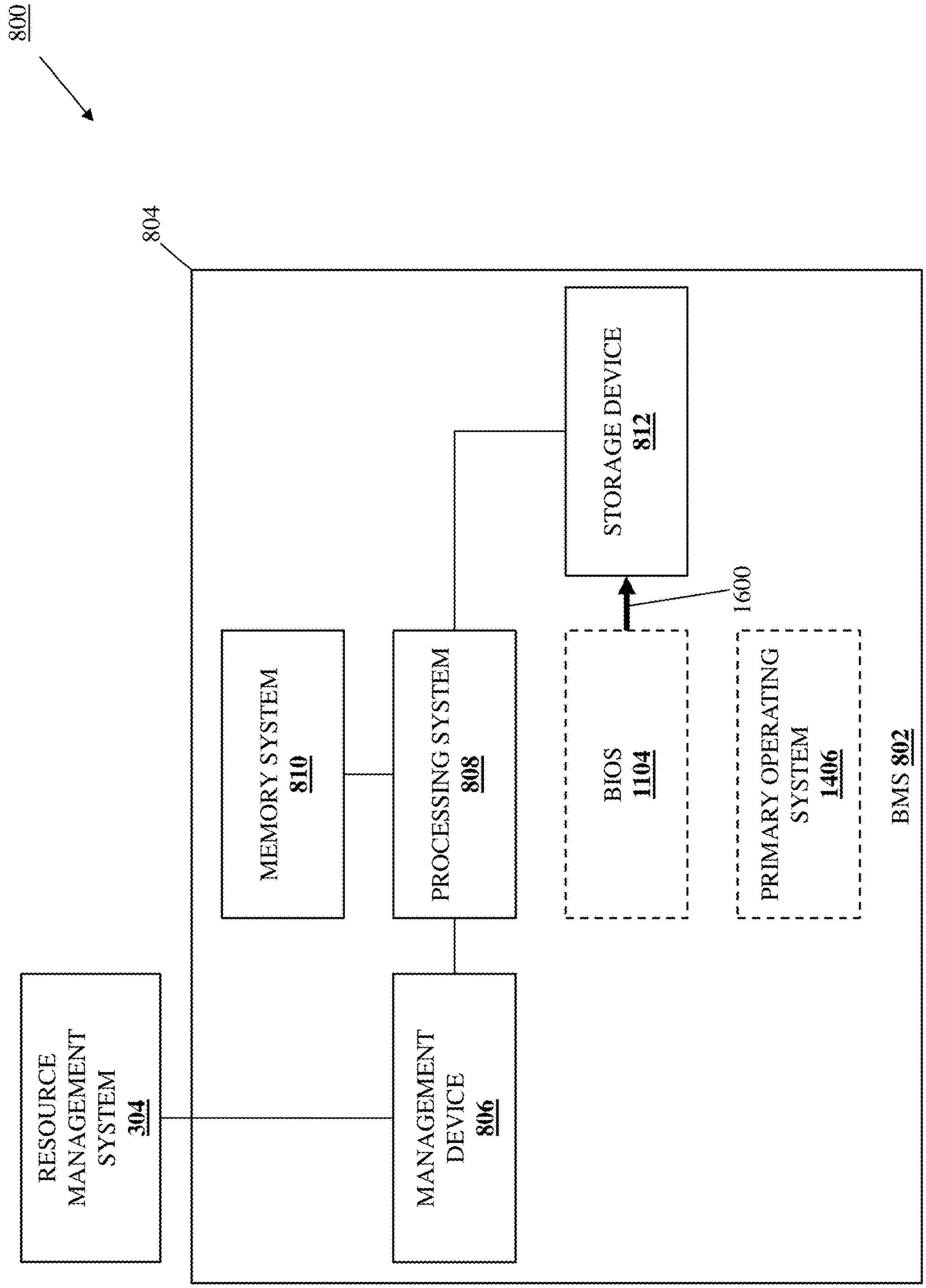
FIG. 16 is a schematic view illustrating an embodiment of the LCS provisioning subsystem of FIG. 8 operating during the method of FIG. 7.

The method 700 then proceeds to block 712 where the BIOS uses the first BIOS identity to unlock the secondary operating system region of the storage device. With reference to FIG. 16, in an embodiment of block 712, the BIOS 1104 may perform secondary operating system region unlocking operations 1600 to unlock the secondary operating system region of the storage device 812. For example, at block 712, the BIOS 1104 may access the second BIOS keys discussed above, and may use the second BIOS keys to unlock the secondary operating system region of the storage device 812. As will be appreciated by one of skill in the art in possession of the present disclosure, following block 712, the BMS 802 is configured to provide an LCS, with the primary operating system 1406 (e.g., the LCS provider operating system provided by the LCS provider microvisor discussed above) configured on the BMS 802 to provide an LCS using the BMS 802 similarly as described above.

Figure 17A:
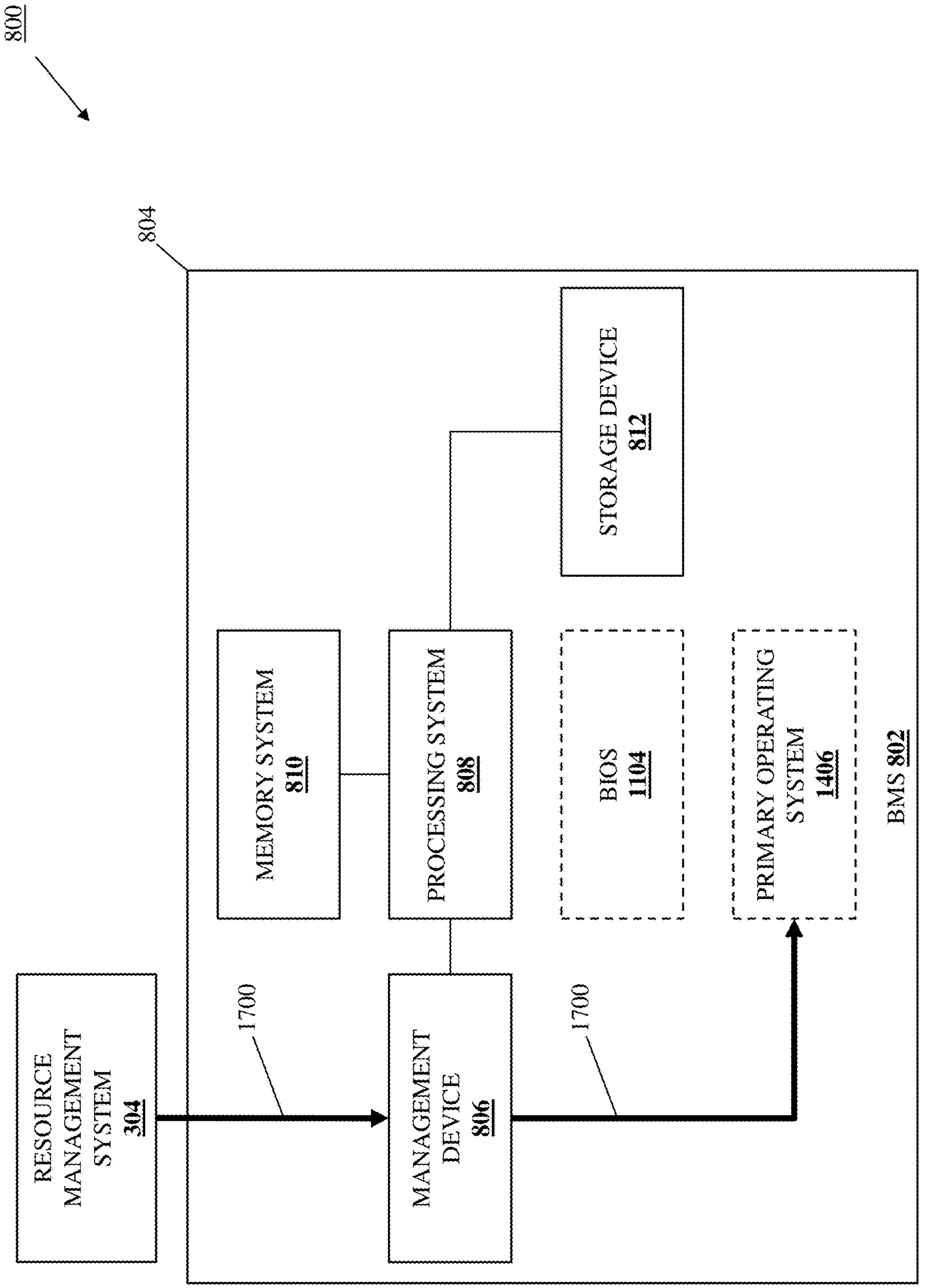
FIG. 17A is a schematic view illustrating an embodiment of the LCS provisioning subsystem of FIG. 8 operating during the method of FIG. 7.
Figure 17B:
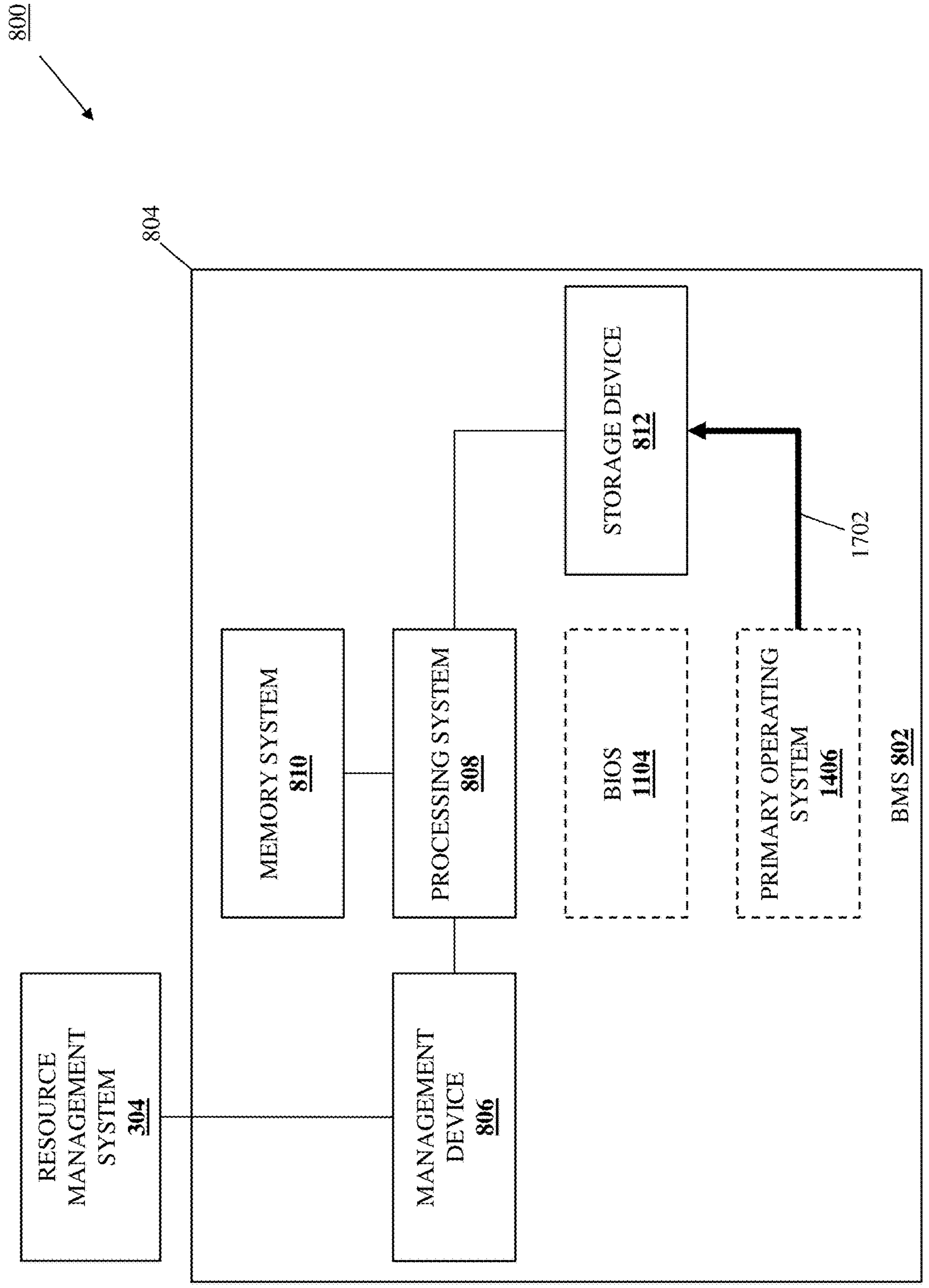
FIG. 17B is a schematic view illustrating an embodiment of the LCS provisioning subsystem of FIG. 8 operating during the method of FIG. 7.

The method 700 then proceeds to block 714 where the primary operating system installs a secondary operating system image on the secondary operating system region of the storage device. With reference to FIG. 17A, in an embodiment of block 714, the resource management system 304 may perform secondary operating system image provisioning operations 1700 that include providing a secondary operating system image to the primary operating system 1406. For example, at block 714, the resource management system 304 may receive a workload intent from a user as described above, and that workload intent may include a request to utilize an LCS user operating system such as an LCS user microvisor to provide an LCS that satisfies that workload intent, causing the resource management system 304 to provide an LCS user operating system image (e.g., the secondary operating system image discussed above) for that LCS user operating system to the primary operating system 1406. With reference to FIG. 17B, at block 714 and in response to receiving the secondary operating system image, the primary operating system 1506 may perform secondary operating system image storage operations 1702 that include storing the secondary operating system image on the secondary operating system region of the storage device 812.

Figure 18:
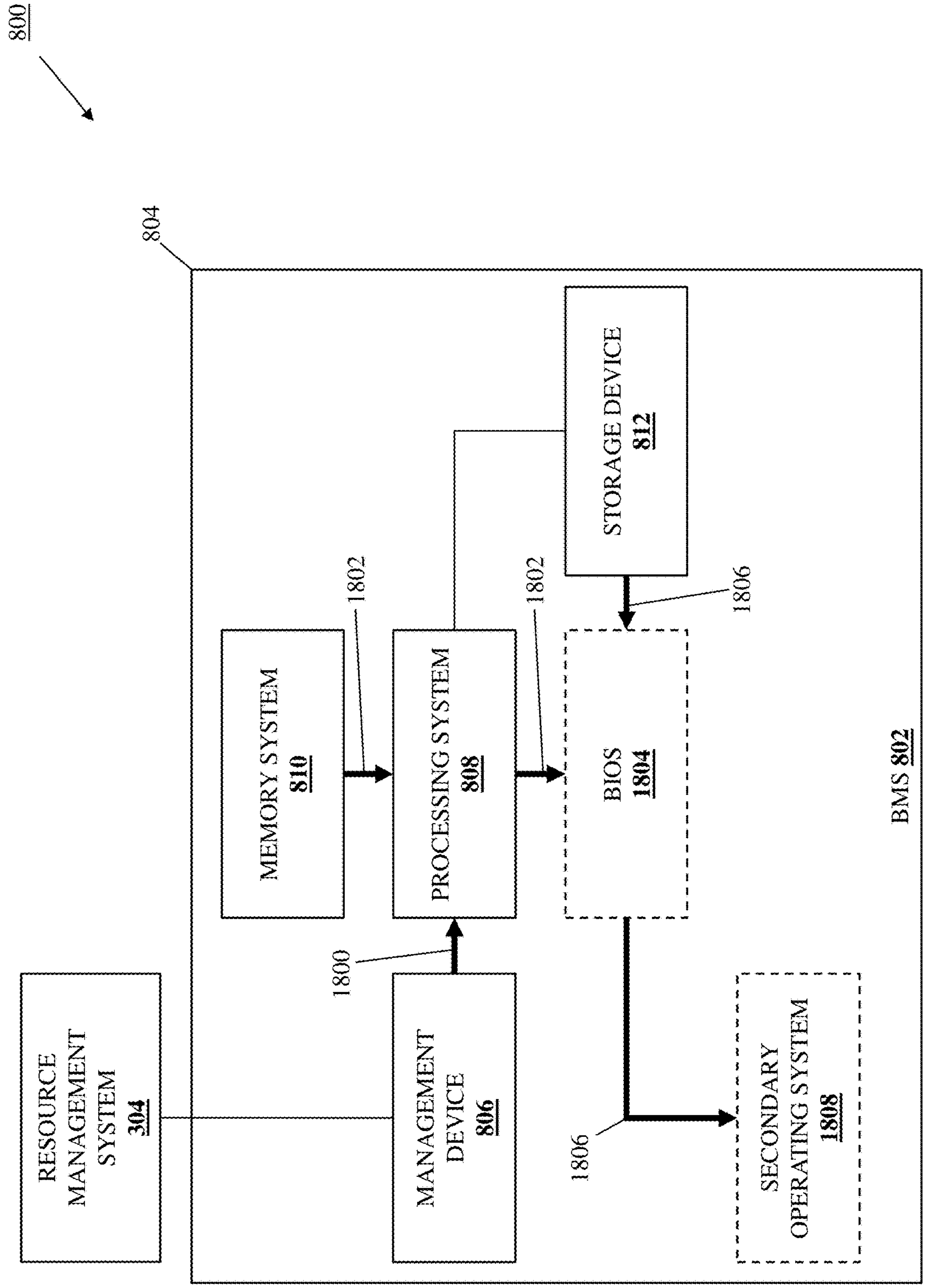
FIG. 18 is a schematic view illustrating an embodiment of the LCS provisioning subsystem of FIG. 8 operating during the method of FIG. 7.

The method 700 then proceeds to block 716 where the BIOS uses a second BIOS identity and the secondary operating system image to provide a secondary operating system via the secondary operating system region of the storage device. In an embodiment, following the storage of the secondary operating system image on the secondary operating system region of the storage device 812, the BIOS 1104 may cause the BMS 802 to reboot. With reference to FIG. 18, at block 716 and in response to the reboot of the BMS 802, the management device 806 may perform second identity BIOS provisioning instruction operations 1800 that include transmitting an instruction to the processing system 808 to provide a BIOS that uses a second BIOS identity, with that instruction causing the processing system 808 to perform second identity BIOS provisioning operations 1802 that include executing BIOS instructions stored on the memory system 810 to provide a BIOS 1804 that uses a second BIOS identity. In the embodiments discussed below, the second BIOS identity of the BIOS 1804 is provided by making the second BIOS keys discussed above available to the BIOS 1804 (e.g., from a secure portion of the memory system, a TPM, and/or other key storage subsystems that would be apparent to one of skill in the art in possession of the present disclosure), while preventing the second BIOS identity of the BIOS 1804 from accessing the first BIOS keys discussed above. However, while a specific example of providing a BIOS that uses different BIOS identities has been provided, one of skill in the art in possession of the present disclosure will appreciate how other techniques for providing a BIOS that uses different BIOS identities will fall within the scope of the present disclosure as well.

With continued reference to FIG. 18, the BIOS 1804 may then perform secondary operating system provisioning operations 1806 that include using the secondary operating system image stored in the secondary operating system region of the storage device 812 to provide a secondary operating system 1808. As discussed above, the secondary operating system 1808 may provide an LCS user operating system that includes an LCS user microvisor that is configured to provide an LCS using the BMS 802 similarly as described above. As such, one of skill in the art in possession of the present disclosure will appreciate how the resource management system 304 may subsequently use the secondary operating system 1808 to provide an LCS using the BMS 802 and resource device(s) substantially as described in detail above.

As will be appreciated by one of skill in the art in possession of the present disclosure, the securing of the primary operating system region of the storage device 812 by the BIOS 1104 using the first BIOS identity (e.g., using the first BIOS keys discussed above), and the providing of the secondary operating system 1808 via the secondary operating system region of the storage device 812 by the BIOS 1902 using the second BIOS identity (e.g., using the first second BIOS keys discussed above) prevents the secondary operating system 1808 from accessing the primary operating system region of the storage device 812, as the BIOS 1902 and secondary operating system 1808 do not have access to the first BIOS keys that were used to secure the primary operating system region of the storage device 812 that provides the primary operating system 1406. As such, the secondary operating system 1808 may be unable to "see", access, and/or modify the primary operating system image or related data that could affect the operation or security of the primary operating system 1406.

However, while the primary operating system region of the storage device 812 is generally described above as being inaccessible to the secondary operating system 1808/BIOS 1804 using the second BIOS identity, in some embodiments portions of the primary operating system region of the storage device 812 may be configured as "read-only", and those "read-only" portions may be made accessible to the secondary operating system 1808/BIOS 1804. As such, block 704 of the method 700 may include the BIOS 1104 using the first BIOS identity to create a read-only portion of the primary operating system region in the storage device 812 (e.g., a first portion of the primary operating system region may be configured to be inaccessible, while a second portion of the primary operating system region may be configured as read-only), with the BIOS 1804 using the second BIOS identity to provide access for the secondary operating system 1808 to that read-only portion of the primary operating system region in the storage device 812.

Figure 19:
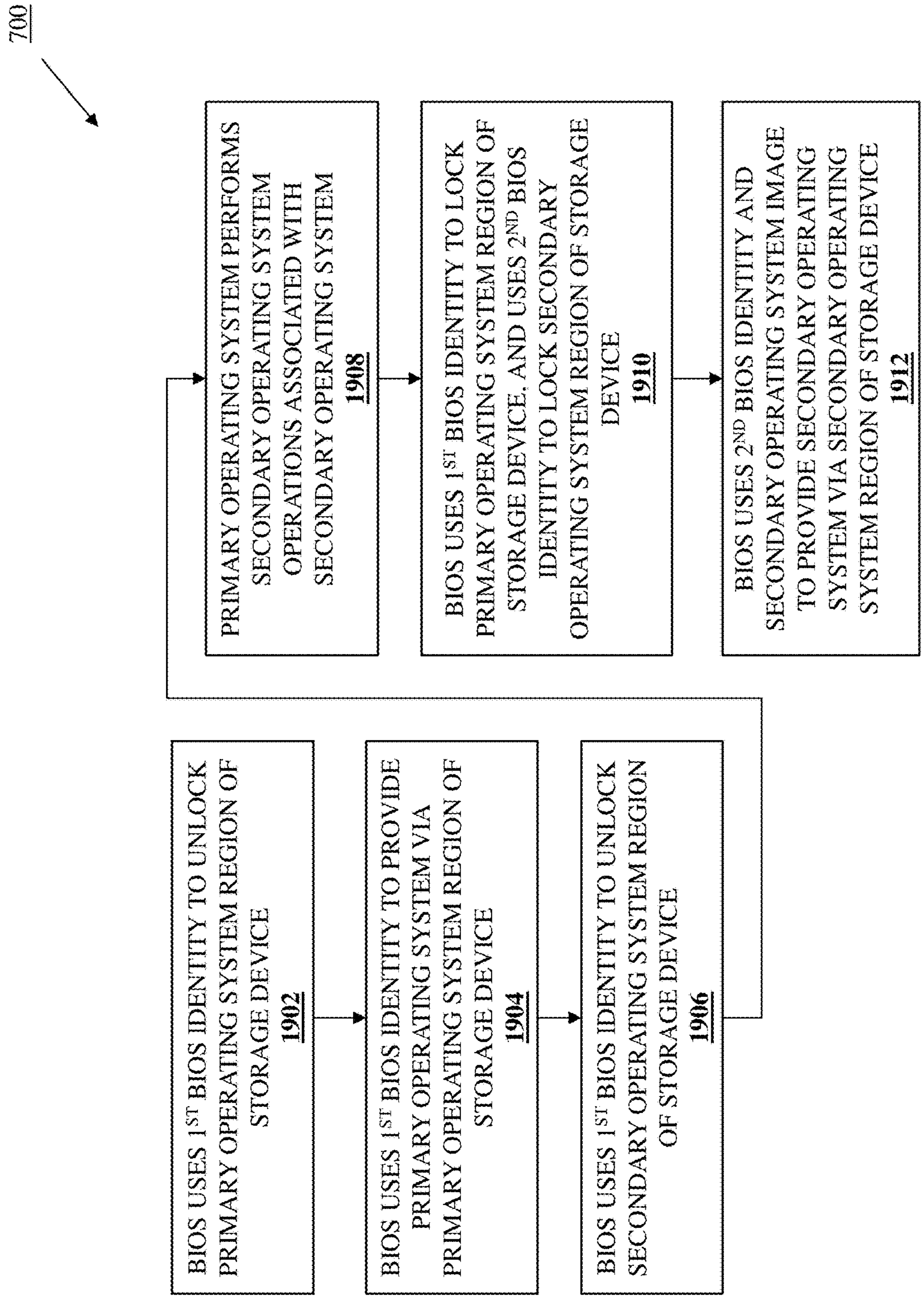
FIG. 19 is a flow chart illustrating an embodiment of a method for providing LCSs using multiple operating systems on a storage device.

Referring now to FIG. 19, an embodiment of a method 1900 for providing LCSs using multiple operating systems on a storage device is illustrated. As described in further detail below, following the provisioning of the secondary operating system 1808 using the BMS 802 according to the method 700 described above, the primary operating system 1406 may be provided to repair the secondary operating system 1808, determine whether the secondary operating system 1808 is operating according to one or more policies, and/or perform other secondary operating system operations associated with the secondary operating system 1808.

Figure 20:
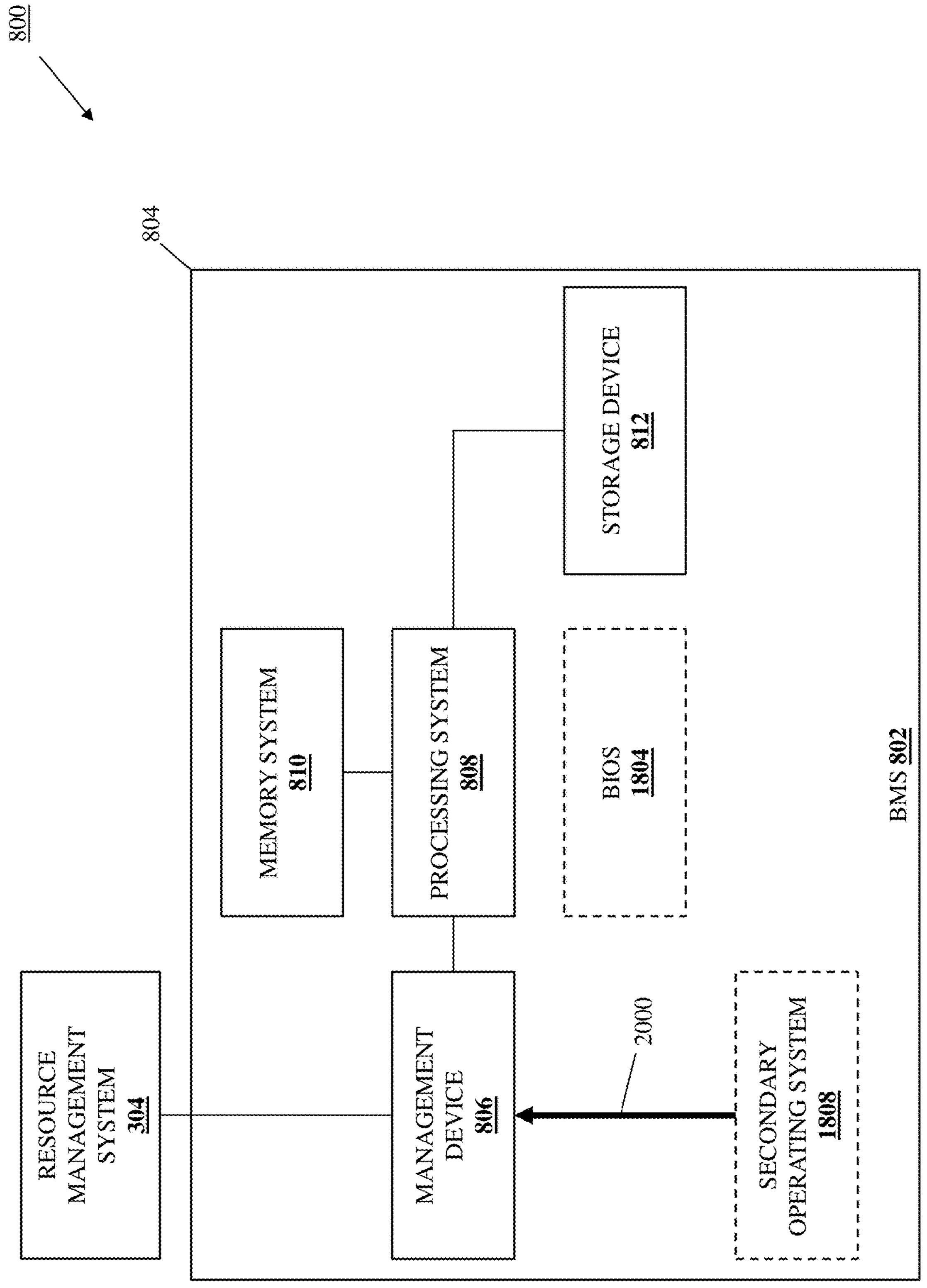
FIG. 20 is a schematic view illustrating an embodiment of the LCS provisioning subsystem of FIG. 8 operating during the method of FIG. 7.

The method 1900 begins at block 1902 where the BIOS uses the first BIOS identity to unlock the primary operating system region of the storage device. With reference to FIG. 20, in some embodiments of block 1902, the secondary operating system 1808 may perform secondary operating system repair request operations 2000 that include "requesting" the performance of the secondary operating system repair operations described below. For example, in some embodiments the utilization of the secondary operating system 1808 may result in some "damage" to the secondary operating system 1808 such as a corruption in the secondary operating system region of the storage device 812 that is used to provide the secondary operating system 1808 and, in response, the secondary operating system 1808 may generating and transmitting the "request" for the performance of secondary operating system repair operations that are configured to repair that "damage".

As such, while the secondary operating system repair request operations 2000 that provide the "request" to perform the secondary operating system repair operations are illustrated as being performed by the secondary operating system 1808, one of skill in the art in possession of the present disclosure will appreciate that the "request" for the performance of the secondary operating system repair operations may be any communication that is generated by any component in the BMS 802 in response to the corruption in the secondary operating system region of the storage device 812 that is used to provide the secondary operating system 1808, and/or in response to any other "damage" that has occurred to the secondary operating system 1808. Furthermore, while a specific example of "damage" to the secondary operating system 1808 has been described, one of skill in the art in possession of the present disclosure will appreciate how a variety of "damage" to the secondary operating system 1808 may be repaired via the secondary operating system repair operations discussed below while remaining within the scope of the present disclosure.

Further still, as described above, the method 1900 may also be performed to periodically monitor the secondary operating system 1808 to determine whether the secondary operating system 1808 is conforming to one or more policies. As such, block 1902 may be initiated based on a timer or other determination that the periodic policy monitoring should be performed. In an embodiment of block 1902 and in response to the request to perform the secondary operating system repair operations, the periodic policy monitoring, or any other trigger to perform other secondary operating system operations that would be apparent to one of skill in the art in possession of the present disclosure, the management device 806 may cause the BMS 802 to power on, boot, reset, reboot, and/or otherwise initialize.

Figure 21:
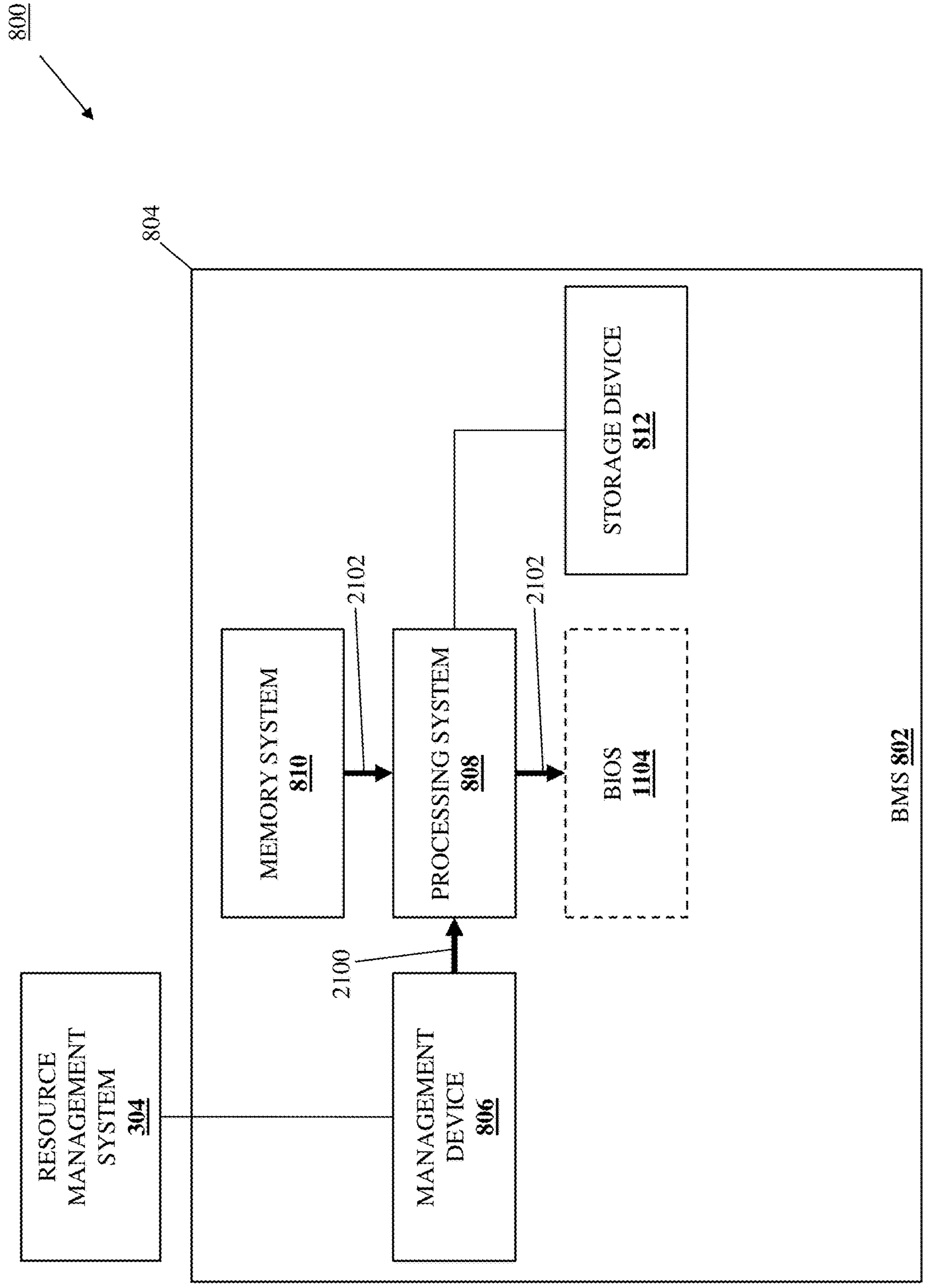
FIG. 21 is a schematic view illustrating an embodiment of the LCS provisioning subsystem of FIG. 8 operating during the method of FIG. 7.
Figure 22:
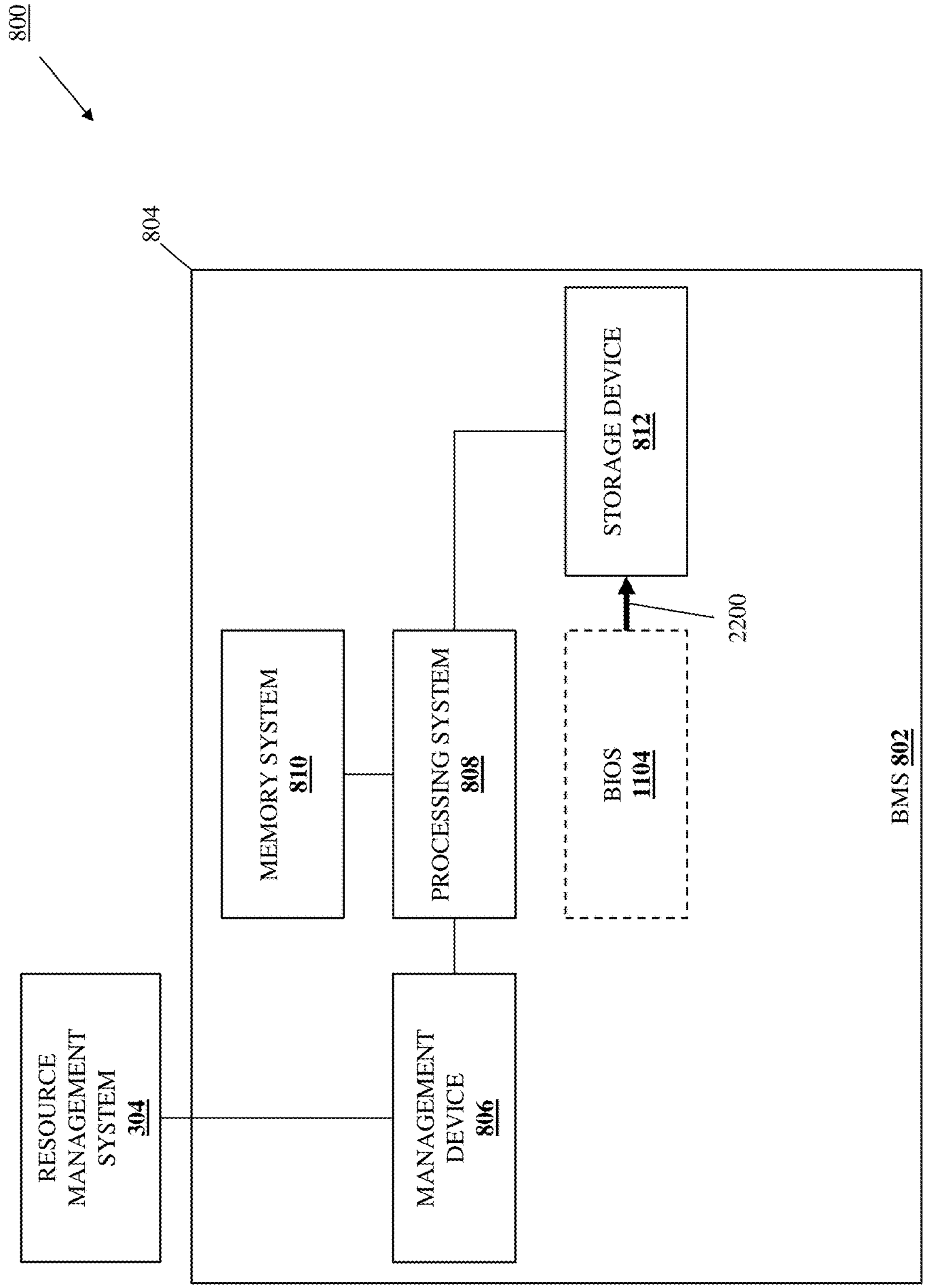
FIG. 22 is a schematic view illustrating an embodiment of the LCS provisioning subsystem of FIG. 8 operating during the method of FIG. 7.

With reference to FIG. 21, in response to initialization of the BMS 802, the management device 806 may perform first identity BIOS provisioning instruction operations 2100 that include transmitting an instruction to the processing system 808 to provide the BIOS that uses the first BIOS identity, with that instruction causing the processing system 808 to perform first identity BIOS provisioning operations 2102 that include executing BIOS instructions stored on the memory system 810 to provide the BIOS 1104 that uses the first BIOS identity as discussed above. With reference to FIG. 22, in an embodiment of block 1902, the BIOS 1104 using the first BIOS identity may then perform primary operating system region unlocking operations 2200 that may include unlocking primary operating system region of the storage device 812. For example, at block 1902, the BIOS 1104 may access the first BIOS keys discussed above and use those first BIOS keys to unlock the primary operating system region of the storage device 812.

Figure 23:
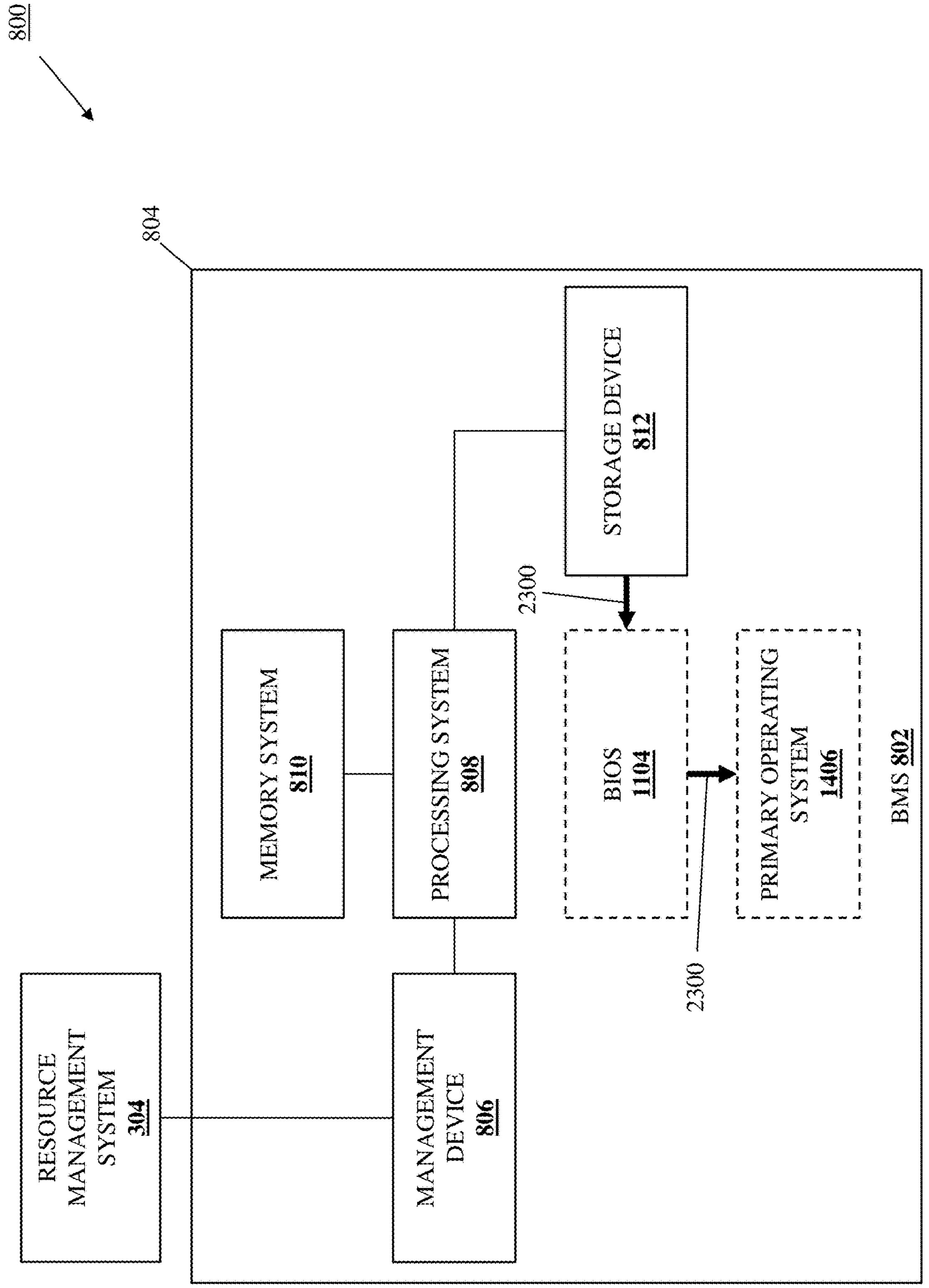
FIG. 23 is a schematic view illustrating an embodiment of the LCS provisioning subsystem of FIG. 8 operating during the method of FIG. 7.

The method 1900 then proceeds to block 1904 where the BIOS uses the first BIOS identity to provide the primary operating system via the primary operating system region of the storage device. With reference to FIG. 23, in an embodiment of block 1904, the BIOS 1104 may then perform primary operating system provisioning operations 2300 that include accessing the primary operating system region of the storage device 812, and using the primary operating system image stored on the primary operating system region to provide the primary operating system 1406 similarly as described above. As described above, the primary operating system 1406 may be provided by an LCS provider operating system such as an LCS provider microvisor that is configured to provide LCSs using the BMS 802, although other operating systems will fall within the scope of the present disclosure as well.

Figure 24:
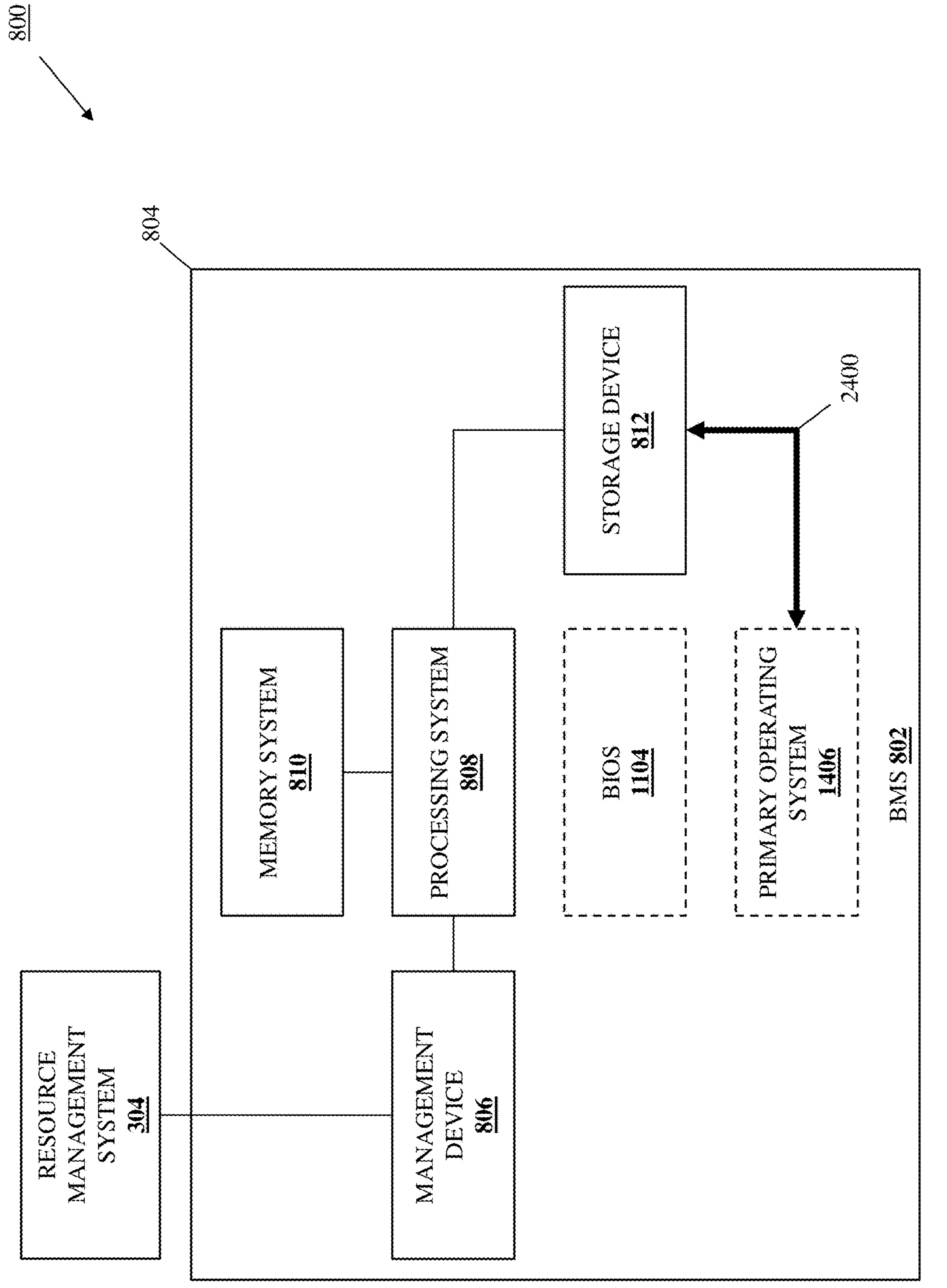
FIG. 24 is a schematic view illustrating an embodiment of the LCS provisioning subsystem of FIG. 8 operating during the method of FIG. 7.

The method 1900 may then proceed to block 1906 where the BIOS uses the first BIOS identity to unlock the secondary operating system region of the storage device. With reference to FIG. 24, in an embodiment of block 1906, the BIOS 1104 may perform secondary operating system region locking operations 2400 to unlock the secondary operating system region of the storage device 812. For example, at block 1906, the BIOS 1104 may access the second BIOS keys discussed above, and use the second BIOS keys to unlock the secondary operating system region of the storage device 812. As will be appreciated by one of skill in the art in possession of the present disclosure, the secondary operating system repair operations described herein may require access to the secondary operating system region of the storage device 812 in order to, for example, repair a corruption in the secondary operating system region of the storage device 812 and/or repair other "damage" that may be occurred to the secondary operating system 1808 perform the periodic policy monitoring operations for the secondary operating system 1808 discussed below, and/or perform any other secondary operating system operations that would be apparent to one of skill in the art in possession of the present disclosure.

The method 1900 then proceeds to block 1908 where the primary operating system performs secondary operating system operations associated with the secondary operating system. As discussed above, in some embodiments of block 1908, the primary operating system 1406 may perform the secondary operating system repair operations discussed above that may include accessing the secondary operating system region of the storage device 812 and repairing a corruption in the secondary operating system region of the storage device 812, and/or performing any other secondary operating system repair operations that one of skill in the art in possession of the present disclosure would recognize as repairing any other "damage" that may have occurred to the secondary operating system 1808.

However, as also discussed above, in some embodiments of block 1908 the primary operating system 1406 may perform the periodic policy monitoring discussed above that may include accessing any details of the operation of the secondary operating system 1808 (e.g., via operating logs for the secondary operating system 1808 that may be stored in any storage subsystem included in the BMS 802) and determining whether any policies associated with the secondary operating system 1808 have been violated by the utilization of the secondary operating system 1808. However, while a few specific examples of secondary operating system operations have been described, one of skill in the art in possession of the present disclosure will appreciate how the primary operating system 1406 may perform a variety of operations associated with the secondary operating system 1808 during the method 1900 while remaining within the scope of the present disclosure.

Figure 25:
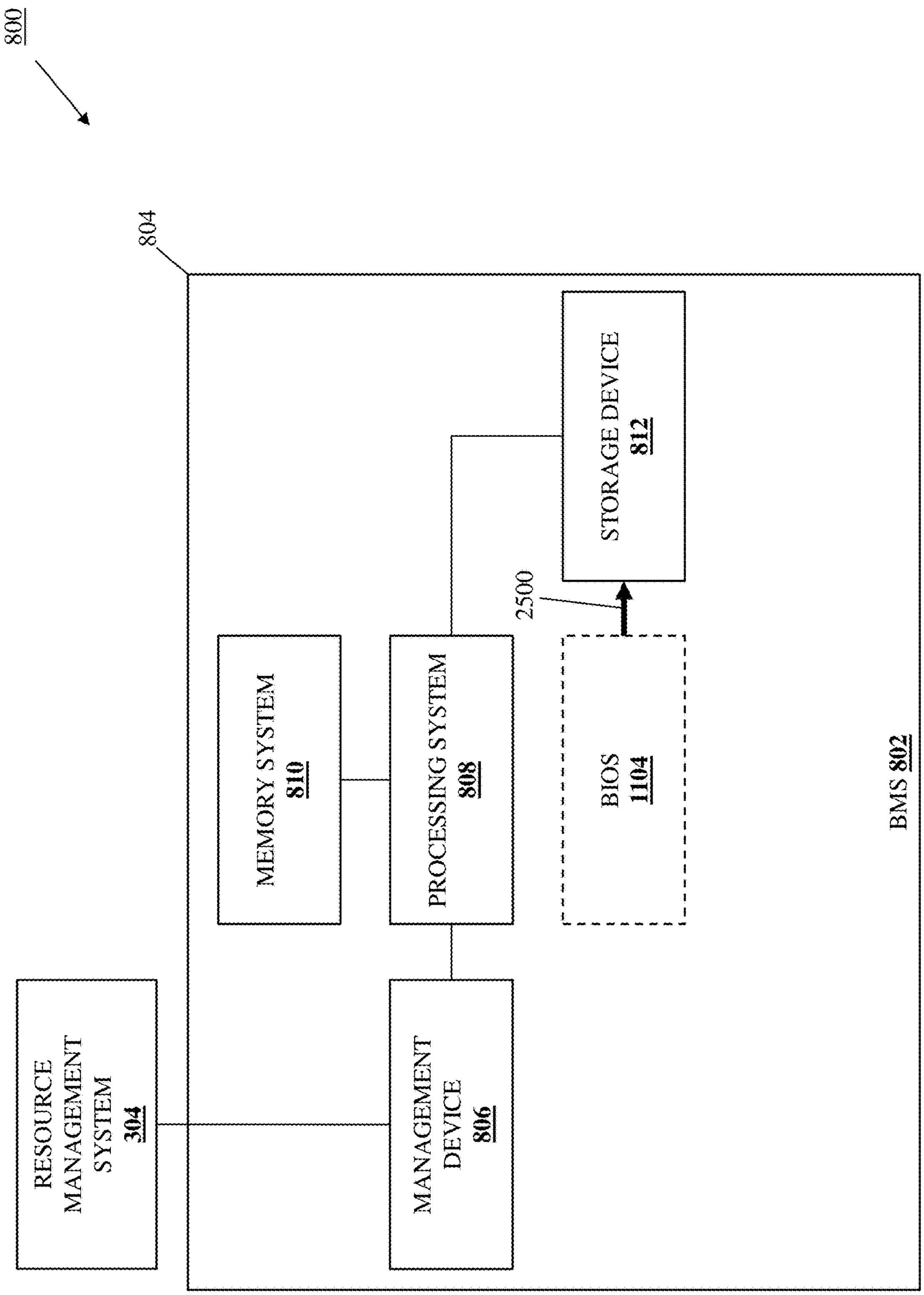
FIG. 25 is a schematic view illustrating an embodiment of the LCS provisioning subsystem of FIG. 8 operating during the method of FIG. 7.

The method 1900 then proceeds to block 1910 where the BIOS uses the first BIOS identity to lock the primary operating system region of the storage device, and uses the second BIOS identity to lock the secondary operating system region of the storage device. With reference to FIG. 25, in an embodiment of block 1910 and following the performance of the secondary operating system operations, the BIOS 1104 may perform primary and secondary operating system region locking operations 2500 to lock the primary operating system region of the storage device 812 and the secondary operating system region of the storage device 812. For example, at block 1910, the BIOS 1104 may access the first BIOS keys and second BIOS keys discussed above, use the first BIOS keys to lock the primary operating system region of the storage device 812, and use the second BIOS keys to lock the secondary operating system region of the storage device 812.

Figure 26:
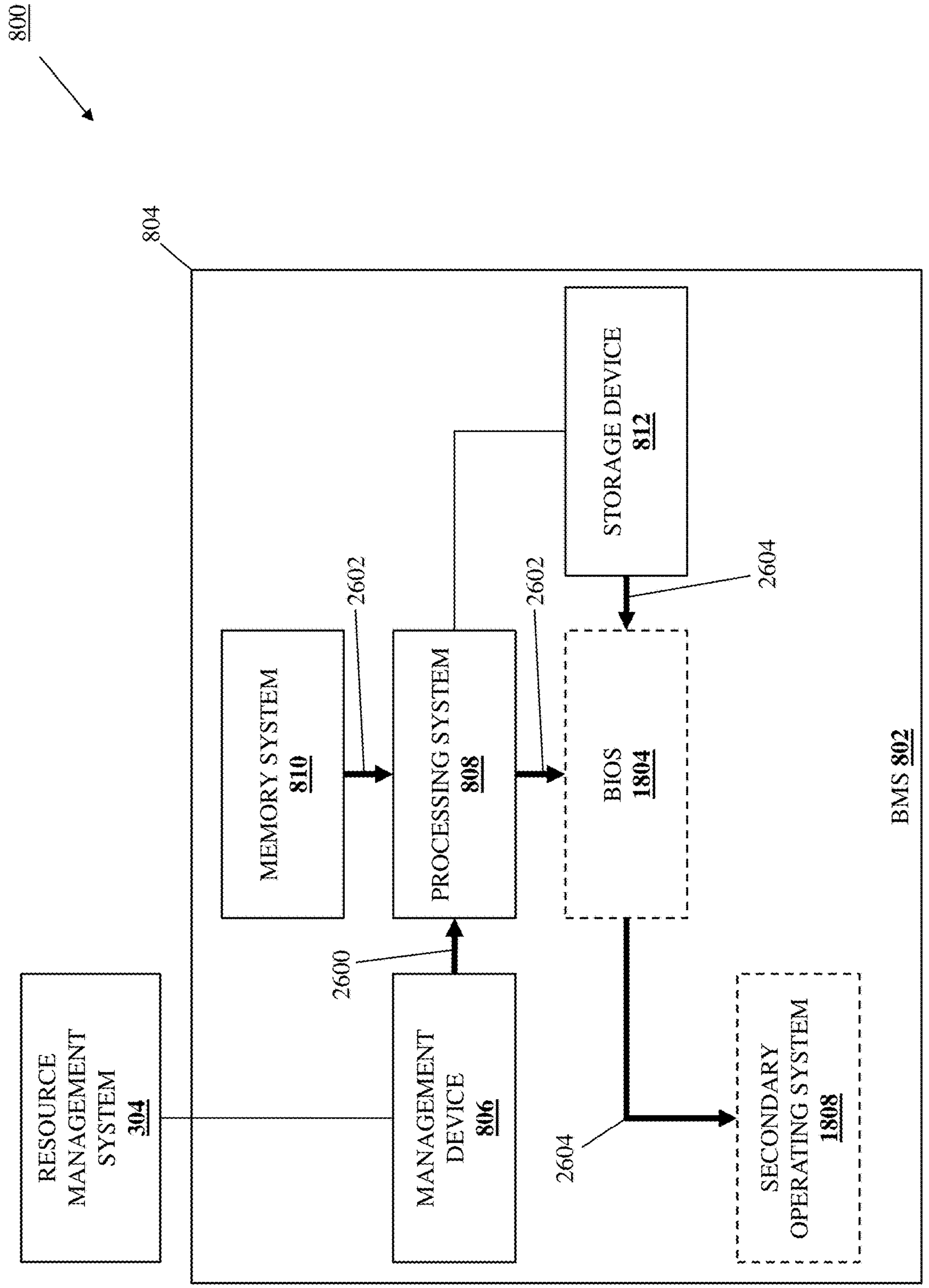
FIG. 26 is a schematic view illustrating an embodiment of the LCS provisioning subsystem of FIG. 8 operating during the method of FIG. 7.

The method 1900 then proceeds to block 1912 where the BIOS uses the second BIOS identity and the secondary operating system image to provide the secondary operating system via the secondary operating system region of the storage device. In an embodiment, following the performance of the secondary operating system operations and the locking of the primary operating system region (and in some cases the secondary operating system region) of the storage device 812, the BIOS 1104 may cause the BMS 802 to reboot. With reference to FIG. 26, at block 1912 and in response to the reboot of the BMS 802, the management device 806 may perform second identity BIOS provisioning instruction operations 2600 that include transmitting an instruction to the processing system 808 to provide the BIOS that uses the second BIOS identity, with that instruction causing the processing system 808 to perform second identity BIOS provisioning operations 2602 that include executing BIOS instructions stored on the memory system 810 to provide the BIOS 1804 that uses the second BIOS identity as described above. With continued reference to FIG. 26, the BIOS 1804 may then perform secondary operating system provisioning operations 2604 that include using the secondary operating system image stored in the secondary operating system region of the storage device 812 to provide the secondary operating system 1808, and one of skill in the art in possession of the present disclosure will appreciate how that secondary operating system 1808 may have been repaired, monitored, or otherwise operated on according to the method 1900 as described above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage device/multi-operating-system Logically Composed System (LCS) provisioning system, comprising:
- a Bare Metal Server (BMS) including a storage device; and
- a Basic Input/Output System (BIOS) that is included in the BMS and that is configured to:
  - create, using a first BIOS identity, a primary Operating System (OS) region and a secondary OS region of the storage device;
  - secure, using the first BIOS identity, the primary OS region of the storage device;
  - provide, using the first BIOS identity, a primary OS via the primary OS region of the storage device, wherein the primary OS installs a secondary OS image on the secondary OS region of the storage device;
  - lock, using the first BIOS identity, the primary OS region of the storage device; and
  - provide, using a second BIOS identity and the secondary OS image on the secondary OS region of the storage device, a secondary OS via the secondary OS region of the storage device, wherein the securing of the primary OS region of the storage device using the first BIOS identity and the providing of the secondary OS via the secondary OS region of the storage device using the second BIOS identity prevents the secondary OS from accessing the primary OS region of the storage device.

2. The system of claim 1, wherein the BIOS is configured to:
- unlock, using the first BIOS identity prior to creating the primary OS region and the secondary OS region of the storage device, the storage device.

3. The system of claim 1, wherein the securing of the primary OS region of the storage device includes:
- encrypting, using encryption information that is accessible to the BIOS using the first BIOS identity but that is not accessible to the BIOS using the second BIOS identity, the primary OS region of the storage device.

4. The system of claim 1, wherein the BIOS is configured to:
- unlock, using the first BIOS identity prior to the primary OS installing the secondary OS image on the secondary OS region of the storage device, the secondary OS region of the storage device.

5. The system of claim 1, wherein the BIOS is configured to:
- provide, using the first BIOS identity subsequent to providing the secondary OS via the secondary OS region of the storage device, the primary OS via the primary OS region of the storage device, wherein the primary OS is configured to:
  - determine whether the secondary OS is complying with at least one policy.

6. The system of claim 1, wherein the BIOS is configured to:
- provide, using the first BIOS identity subsequent to providing the secondary OS via the secondary OS region of the storage device, the primary OS via the primary OS region of the storage device, wherein the primary OS is configured to:
  - repair the secondary OS.

7. An Information Handling System (IHS), comprising:
- a processing system; and
- a memory system that is coupled to the processing system and that includes instructions that, when executed by the processing system, cause the processing system to provide a Basic Input/Output System (BIOS) that is configured to:
  - create, using a first BIOS identity, a first primary Operating System (OS) region and a secondary OS region of a storage device in a Bare Metal Server (BMS);
  - secure, using the first BIOS identity, the first primary OS region of the storage device;
  - provide, using the first BIOS identity, a primary OS via the first primary OS region of the storage device, wherein the primary OS installs a secondary OS image on the secondary OS region of the storage device;
  - lock, using the first BIOS identity, the first primary OS region of the storage device; and
  - provide, using a second BIOS identity and the secondary OS image on the secondary OS region of the storage device, a secondary OS via the secondary OS region of the storage device, wherein the securing of the first primary OS region of the storage device using the first BIOS identity and the providing of the secondary OS via the secondary OS region of the storage device using the second BIOS identity prevents the secondary OS from accessing the first primary OS region of the storage device.

8. The IHS of claim 7, wherein the BIOS is configured to:
- unlock, using the first BIOS identity prior to creating the first primary OS region and the secondary OS region of the storage device, the storage device.

9. The IHS of claim 7, wherein the securing of the first primary OS region of the storage device includes:
- encrypting, using encryption information that is accessible to the BIOS using the first BIOS identity but that is not accessible to the BIOS using the second BIOS identity, the first primary OS region of the storage device.

10. The IHS of claim 7, wherein the BIOS is configured to:
- unlock, using the first BIOS identity prior to the primary OS installing the secondary OS image on the secondary OS region of the storage device, the secondary OS region of the storage device.

11. The IHS of claim 7, wherein the BIOS is configured to:

provide, using the first BIOS identity subsequent to providing the secondary OS via the secondary OS region of the storage device, the primary OS via the first primary OS region of the storage device, wherein the primary OS is configured to:

determine whether the secondary OS is complying with at least one policy.

12. The IHS of claim 7, wherein the BIOS is configured to:

provide, using the first BIOS identity subsequent to providing the secondary OS via the secondary OS region of the storage device, the primary OS via the first primary OS region of the storage device, wherein the primary OS is configured to:

repair the secondary OS.

13. The IHS of claim 7, wherein the BIOS is configured to:

create, using the first BIOS identity, a second primary OS region of the storage device that is read-only; and provide, using the second BIOS identity, access for the secondary OS to the second primary OS region of the storage device.

14. A method for providing Logically Composed Systems (LCSs) using multiple operating systems on a storage device, comprising:

creating, by a Basic Input/Output System (BIOS) using a first BIOS identity, a first primary Operating System (OS) region and a secondary OS region of a storage device in a Bare Metal Server (BMS);

securing, by the BIOS using the first BIOS identity, the first primary OS region of the storage device;

providing, by the BIOS using the first BIOS identity, a primary OS via the first primary OS region of the storage device, wherein the primary OS installs a secondary OS image on the secondary OS region of the storage device;

locking, by the BIOS using the first BIOS identity, the first primary OS region of the storage device; and providing, by the BIOS using a second BIOS identity and the secondary OS image on the secondary OS region of the storage device, a secondary OS via the secondary OS region of the storage device, wherein the securing of the first primary OS region of the storage device using the first BIOS identity and the providing of the secondary OS via the secondary OS region of the storage device using the second BIOS identity prevents the secondary OS from accessing the first primary OS region of the storage device.

15. The method of claim 14, further comprising:

unlocking, by the BIOS using the first BIOS identity prior to creating the first primary OS region and the secondary OS region of the storage device, the storage device.

16. The method of claim 14, wherein the securing of the first primary OS region of the storage device includes:

encrypting, by the BIOS using encryption information that is accessible to the BIOS using the first BIOS identity but that is not accessible to the BIOS using the second BIOS identity, the first primary OS region of the storage device.

17. The method of claim 14, further comprising:

unlocking, by the BIOS using the first BIOS identity prior to the primary OS installing the secondary OS image on the secondary OS region of the storage device, the secondary OS region of the storage device.

18. The method of claim 14, further comprising:

providing, by the BIOS using the first BIOS identity subsequent to providing the secondary OS via the secondary OS region of the storage device, the primary OS via the first primary OS region of the storage device; and determining, by the primary OS, whether the secondary OS is complying with at least one policy.

19. The method of claim 14, further comprising:

provide, using the first BIOS identity subsequent to providing the secondary OS via the secondary OS region of the storage device, the primary OS via the first primary OS region of the storage device; and repairing, by the primary OS, the secondary OS.

20. The method of claim 14, further comprising:

creating, by the BIOS using the first BIOS identity, a second primary OS region of the storage device that is read-only; and providing, by the BIOS using the second BIOS identity, access for the secondary OS to the second primary OS region of the storage device.

* * * * *